United States Patent
Martinez

(10) Patent No.: US 7,485,209 B2
(45) Date of Patent: Feb. 3, 2009

(54) PROCESS, METHOD, AND DEVICE FOR THE PRODUCTION AND/OR DERIVATION OF HYDROGEN UTILIZING MICROWAVE ENERGY

(76) Inventor: Néstor Martinez, 6601 SW. 137 Ct., Unit C, Miami, FL (US) 33183

( * ) Notice: Subject to any disclaimer, the term of this patent is extended or adjusted under 35 U.S.C. 154(b) by 12 days.

(21) Appl. No.: 12/034,760

(22) Filed: Feb. 21, 2008

(65) Prior Publication Data
US 2008/0128411 A1 Jun. 5, 2008

Related U.S. Application Data

(63) Continuation-in-part of application No. 11/541,836, filed on Oct. 2, 2006, which is a continuation-in-part of application No. 11/473,424, filed on Jun. 26, 2006.

(51) Int. Cl.
*B01J 19/08* (2006.01)
*B01J 7/00* (2006.01)
*C01B 3/08* (2006.01)

(52) U.S. Cl. .................. 204/157.43; 48/61; 423/657; 423/658

(58) Field of Classification Search .............. 48/61; 423/657, 658; 204/157.43
See application file for complete search history.

(56) References Cited

U.S. PATENT DOCUMENTS

| | | | |
|---|---|---|---|
| 4,435,374 A | 3/1984 | Helm, Jr. | |
| 5,198,084 A | 3/1993 | Cha et al. | |
| 5,510,201 A * | 4/1996 | Werth ........................... | 429/17 |
| 5,690,902 A * | 11/1997 | Werth ........................... | 423/658 |
| 5,830,426 A * | 11/1998 | Werth ........................... | 423/658 |
| 5,840,270 A * | 11/1998 | Werth ........................... | 423/658 |
| 6,395,252 B1 * | 5/2002 | Getty et al. ................... | 423/657 |
| 6,663,681 B2 | 12/2003 | Kindig et al. | |
| 6,682,714 B2 | 1/2004 | Kindig et al. | |
| 6,685,754 B2 | 2/2004 | Kindig et al. | |
| 6,875,411 B2 | 4/2005 | Sanfilippo et al. | |
| 2004/0101474 A1 * | 5/2004 | Otsuka et al. ................. | 423/657 |
| 2005/0232837 A1 * | 10/2005 | Troczynski et al. .......... | 423/155 |
| 2005/0255037 A1 * | 11/2005 | Otsuka et al. ................. | 423/658 |
| 2006/0188436 A1 * | 8/2006 | Griffin ........................... | 423/657 |

* cited by examiner

*Primary Examiner*—Wayne Langel
(74) *Attorney, Agent, or Firm*—Eric Hanscom; Todd Langford

(57) ABSTRACT

This invention is directed toward a process, method and device for the production and/or derivation of hydrogen utilizing microwave energy through use of a microwave susceptor that absorbs/assimilates microwave energy and converts it to radiant/heat energy which is imparted to iron and alters its physical characteristics such that water in contact with the iron will have one of its physical characteristics, preferably temperature, altered, and result in a reaction of the to produce/derive hydrogen. Invention also includes a progressive change to water prior to it achieving a reactive threshold with the iron element, and the progressive preparation and/or pretreatment of water, via exposure or contact of water with other materials with high thermal conductivities in lieu of iron through use of a microwave susceptor.

17 Claims, No Drawings

PROCESS, METHOD, AND DEVICE FOR THE PRODUCTION AND/OR DERIVATION OF HYDROGEN UTILIZING MICROWAVE ENERGY

CROSS REFERENCE TO RELATED APPLICATIONS

This application is a continuation-in-part and claims the benefit of U.S. patent application Ser. No. 11/541,836 filed Oct. 2, 2006, which in turn is a continuation-in-part and claims the benefit of U.S. patent application Ser. No. 11/473,424 filed Jun. 26, 2006.

STATEMENT REGARDING FEDERALLY SPONSORED RESEARCH OR DEVELOPMENT

This invention was not federally sponsored.

BACKGROUND OF THE INVENTION

There has been a need for a process, method and device for the production and or derivation of Hydrogen at point of use that utilizes available technology and infrastructure systems; specifically, electrical power and water. To bring about what is vernacularly know as the Hydrogen Economy, wherein Hydrogen is a primary fuel, is not achievable in the near term based on current Hydrogen Production methods, Delivery systems, and Storage methods. The following summarizes data on Hydrogen, Hydrogen as a Fuel, and status of Hydrogen Production methods, Delivery systems, and Storage methods. Importantly, it also presents the associated challenges and/or issues with current Hydrogen Production methods, Delivery systems, and Storage methods.

BRIEF SUMMARY OF INVENTION

Process, method and device for the production and/or derivation of hydrogen utilizing microwave energy through use of a microwave susceptor that will absorb and/or assimilate microwave energy and convert it to radiant/heat energy and impart the energy to iron and alter its physical characteristics (such as, but not necessarily limited to its temperature), so that water, upon contact with the iron element, will in turn, alter the water's physical characteristics (such as, but not necessarily limited to its temperature), and result in a reaction of the water and the iron element to produce and/or derive hydrogen. Also includes the progressive change to water prior to it achieving a reactive threshold with the iron element to produce and/or derive hydrogen via the process, method and device of this invention; and, the progressive preparation and/or pretreatment of water, via exposure or contact of water with other materials with high thermal conductivities in lieu of iron through use of a microwave susceptor that will absorb and/or assimilate microwave energy and convert it to radiant/heat energy and impart the energy to said other materials with high thermal conductivities and alter their physical characteristics (such as, but not necessarily limited to their temperature), so that water, upon contact with said other materials with high thermal conductivities, will alter the water's physical characteristics (such as, but not necessarily limited to its temperature)

Hydrogen Facts
    The lightest element and has a density of 0.08988 grams per liter at standard pressure.
    The most abundant element in the universe; typically existing as a diatomic molecule, meaning each molecule has two atoms of Hydrogen. This is why pure Hydrogen is commonly expressed as "$H_2$".
    It is an energy carrier, not an energy source, meaning that it stores and delivers energy in a usable form.
    It is a colorless, odorless, tasteless, and nonpoisonous gas under normal conditions.
    It is not commonly found in its pure form, since it readily combines with other elements.
    It is usually a part of other compounds in nature. Among the compounds is Water ($H_2O$).
        A Gallon of Water contains 166 Cubic Feet of Hydrogen.

Hydrogen as Fuel
    Readily combines with oxygen to form water.
    High energy content per weight (nearly 3 times as much as gasoline), but the energy density per volume is quite low at standard temperature and pressure.
    Volumetric energy density can be increased by storing the hydrogen under increased pressure or storing it at extremely low temperatures as a liquid.
        Energy Content for 1 kg (2.2 lb) of Hydrogen=424 Standard Cubic Feet (Reacting with oxygen to form water)

Higher Heating Value: 134,200 Btu, 39.3 kWh, 141,600 kJ, 33,800 kCal

Lower Heating Value: 113,400 Btu, 33.2 kWh, 119,600 kJ, 28,560 kCal
    Highly flammable; it only takes a small amount of energy to ignite it and make it burn.
        Has a wide flammability range, meaning it can burn when it makes up 4 to 74 percent of air by volume.
        Burns with a pale-blue, near invisible flame, makes hydrogen fires difficult to see.
    The combustion of hydrogen does not produce carbon dioxide ($CO_2$), particulate, or sulfur emissions.

Hydrogen Production
    Hydrogen can be produced using a variety of domestic energy resources—fossil fuels, such as coal and natural gas, with carbon capture and sequestration; renewables, such as biomass, and renewable energy technologies, including solar, wind, geothermal, and hydropower; and nuclear power. Some of the current processes for the production of hydrogen are described, as follows:
    Thermo-Chemical Processes
        Steam methane reforming: In this process, high-temperature steam is used to extract hydrogen from a methane source such as natural gas. This is the most common method of producing hydrogen; about 95 percent of the hydrogen used in the United States is produced using this process.
        Partial oxidation: Scientists are exploring a process that produces hydrogen by simultaneously separating oxygen from air and partially oxidizing methane.
        Other thermal processes: Other processes include (1) splitting water using heat from a solar concentrator, and (2) gasifying or burning biomass (i.e., biological material, such as plants or agricultural waste) to generate a bio-oil or gas, which is then reformed to produce hydrogen.
    Electrolytic
        Electrolysis: In electrolysis, electricity is used to separate water (H2O) into hydrogen and oxygen. Current electrolysis systems are very energy intensive. The challenge is to develop low cost and more energy efficient electrolysis technologies.

Photolytic Processes
  Photolytic methods: In photolysis, sunlight is used to split water. Two photolytic processes are being explored: (1) photobiological methods, in which microbes, when exposed to sunlight, split water to produce hydrogen, and (2) photoelectrolysis, in which semi-conductors, when exposed to sunlight and submersed in water, generate enough electricity to produce hydrogen by splitting the water.
Associated challenges and/or issues with the Hydrogen Production methods outlined above are:
  Utilize fossil fuels, are very energy intensive, or both.
  Photobiological methods, using microbes, split water much too slow to be useful for hydrogen production on a mass scale.
  Photoelectrolysis using semi-conductors; a light-harvesting system with the correct energetics must yet be developed along with a reliable and stable system in an aqueous environment.

Hydrogen Delivery
  Since it can be produced from several sources and using various methods, hydrogen can be produced at large plants and transported to users, or produced locally, using small generators, possibly at refueling stations, eliminating the need for long-distance transport. Hydrogen is currently transported by road via cylinders, tube trailers, cryogenic tankers, and in pipelines, although hydrogen pipelines currently exist in only a few regions of the United States. It is noted the delivery infrastructure for hydrogen requires high-pressure compressors for gaseous hydrogen and liquefaction for cryogenic hydrogen.
  Associated challenges and/or issues with Hydrogen Delivery are:
    Significant capital and operating costs to create a delivery infrastructure.
    Mass delivery systems are energy inefficient.
    Safety concerns due to Hydrogen's high flammability.

Hydrogen Storage
  While hydrogen contains more energy per weight than any other energy carrier, it contains much less energy by volume. This makes it difficult to store a large amount of hydrogen in a small space.
  Technologies
  High-pressure tanks: Hydrogen gas can be compressed and stored in storage tanks at high pressure. These tanks must be strong, durable, light-weight, and compact, as well as cost competitive.
  Liquid hydrogen: Hydrogen can be stored as a liquid. In this form, more hydrogen can be stored per volume, but it must be kept at cold temperatures (about −253° C.).
  Materials-based storage of hydrogen: Hydrogen can be stored within solid materials, such as powders, or liquids. Technologies under study include—
    Reversible Metal Hydrides: Hydrogen combines chemically with some metals, which can result in higher storage capacity compared to high-pressure gas or liquid. These materials can be "re-filled" with hydrogen while on the vehicle.
    Carbon Materials and High Surface Area Sorbents: Carbon nanotubes are examples of materials that reversibly store hydrogen. Other sorbents may be able to store hydrogen at room temperature.
    Chemical Hydride Materials: Materials are under study that release hydrogen by a chemical process on the vehicle. These materials are then removed and "regenerated" off-board, either at the fueling station or at a central processing plant.

Associated challenges and/or issues with Hydrogen Storage are:
  The technical challenges of storage are yet to be overcome.
  An infrastructure is lacking for Hydrogen Delivery (See Prior).

Clearly, the associated challenges and/or issues based on current Hydrogen Production methods, Delivery systems, and Storage methods to bring about what is vernacularly know as the Hydrogen Economy, wherein Hydrogen is a primary fuel, is not achievable in the near future. As previously indicated, there has been a need for a process, method and device for the production of Hydrogen at point of use that utilizes available technology and infrastructure systems; specifically, electrical power and water.

The current invention provides just such a solution via a process, method and device for the production and/or derivation of Hydrogen utilizing microwave energy through use of a microwave susceptor that will absorb and/or assimilate microwave energy and convert it to radiant/heat energy and impart the energy to iron and alter its physical characteristics (such as, but not necessarily limited to its temperature), so that water, upon contact with the iron element, will in turn, alter the water's physical characteristics (such as, but not necessarily limited to its temperature), and result in a reaction of the water and the iron element to produce and/or derive Hydrogen. The invention also includes the progressive change to water prior to it achieving a reactive threshold with the iron element to produce and/or derive Hydrogen via the process, method and device of this invention; and, the progressive preparation and/or pretreatment of water, via exposure or contact of water with other materials with high thermal conductivities in lieu of iron through use of a microwave susceptor that will absorb and/or assimilate microwave energy and convert it to radiant/heat energy and impart the energy to said other materials with high thermal conductivities and alter their physical characteristics (such as, but not necessarily limited to their temperature), so that water, upon contact with said other materials with high thermal conductivities, will alter the water's physical characteristics (such as, but not necessarily limited to its temperature).

The current invention's process, method and device for the production of Hydrogen:
  Does not utilize fossil fuels.
    The reaction of water and iron produces Iron Oxides (i.e. rust). Iron Oxides are not toxic and are stable solids.
  Requires energy, but energy requirement is not significant.
    Energy requirements are those required to power microwave generating device or devices.
  Can produce and/or derive ample amounts of hydrogen.
  Hydrogen is produced and/or derived at point of use that utilizes available technology and infrastructure systems.
    No significant capital and operating costs to create a Hydrogen Delivery infrastructure.
    Inherent energy inefficiency of mass delivery system of Hydrogen is eliminated.
  There are no significant technical challenges of storage related to the Hydrogen produced and/or derived via the process, method and device of this invention.
    The Hydrogen is produced and/or derived at point of use from water.
    The amount of Hydrogen produced and/or derived can be synchronized and/or adjusted to a function of the amount hydrogen required for end use. Storage volume would be minimized and governed by:

Needs for densification of the Hydrogen via compression, refrigeration, or both for enrichment of the combustible mixture of hydrogen and atmospheric oxygen.

Reserve for start-up requirements.

Residuals from shut down.

Due to minimized storage requirements, leakage and/or fire detection sensors would be effective and may be strategically located to initiate emergency shutdown, extinguishment, and/or both in event of leak and/or fire.

Process, Method, and Device of the Invention

The process, method, and device of this invention is key to its success; its primary benefit is a method for the production and/or derivation of hydrogen. It requires iron and a microwave susceptor be physically in contact with each other; and/or sufficiently proximate to each other; and/or united with each other in such a manner and/or manners that their physical arrangement (whether through contact and/or proximity) and/or union (whether through combination, bonding, mixture and/or fusion) with one another, will, upon sufficient exposure of the microwave susceptor to microwave energy, alter the iron's physical characteristics (such as, but not necessarily limited to its temperature) so that channeled and/or directed water, upon exposure or contact with the altered iron will, in turn, alter the channeled and/or directed water's physical characteristics (such as, but not necessarily limited to its temperature) and result in a reaction of the water and the iron to produce and/or derive hydrogen.

The term "iron", whenever used herein, with relation to the process, method and device of this invention, whether in singular, plural or possessive form, also includes compound(s), amalgam(s), alloy(s), composite(s), and/or synthesis(es) with, or of, the element iron; provided said compound(s), amalgam(s), alloy(s), composite(s), and/or synthesis(es) with, or of, the element iron do not suppress and/or significantly subdue the reaction of the water and the element iron with regard to the process, method and device of this invention.

Also, the term "microwave susceptor", whenever used herein, with relation to the process, method and device of this invention, whether in singular, plural or possessive form, refers to a material or combination of materials capable of absorbing and/or assimilating microwave energy and converting it to radiant/heat energy. The material or combination of materials are variable and without limit. Conjointly, if more than a single material is used the nature of the dynamics or interface of the materials, either chemically and/or physically, with one another in order to achieve absorption and/or assimilation microwave energy and converting it to radiant/heat energy is—with regard to the process, method and device of this invention—variable and without limit.

Also, the term "microwave energy", whenever used herein, with relation to the process, method and device of this invention, whether in singular, plural or possessive form, refers to device and/or devices capable of generating microwaves and could include assemblies so configured whereby they would create a resonant effect of the microwaves generated by said device and/or devices. Conjointly, methods of assembly or configuration integrating said device and/or devices capable of generating microwaves is—with regard to the process, method and device of this invention—variable and without limit.

Further, the term "reaction", whenever used herein, with relation to the process, method and device of this invention, whether in singular, plural or possessive form, refers to a fast reaction of the water and the element iron to produce and/or derive hydrogen. To explain, the water continues to heat beyond its saturation temperature to a temperature that permits a fast reaction with the element iron. Among the products of the reaction is hydrogen.

Additionally, the hydrogen resulting from the reaction and comingled and/or immixed with other substances resulting from and/or subsequent the reaction, and/or products or by-products resulting from and/or subsequent the reaction; will undergo extraction, garnering, isolation, filtering, separation, containment and/or containerization via mechanical and/or chemical means and/or action. The technique(s), frequency, and extent of extraction, garnering, isolation, filtering, separation, containment and/or containerization of the hydrogen resulting from and/or subsequent the reaction and comingled and/or immixed with other substances resulting from and/or subsequent the reaction, and/or products or by-products resulting from and/or subsequent the reaction; are variable, without limit, and combinable; as it is scalable to, and in tandem with, the amount of hydrogen produced, derived, and/or required for end use. Accordingly, the technique(s), frequency, and extent of extraction, garnering, isolation, filtering, separation, containment and/or containerization of the hydrogen resulting from and/or subsequent the reaction and comingled and/or immixed with other substances resulting from and/or subsequent the reaction, and/or products or by-products resulting from and/or subsequent the reaction; can range from partial, occasional and/or periodic methods of extraction, garnering, isolation, filtering, separation, containment and/or containerization of the hydrogen resulting from and/or subsequent the reaction and comingled and/or immixed with other substances resulting from and/or subsequent the reaction, and/or products or by-products resulting from and/or subsequent the reaction; to a continuous or semi-continuous extraction, garnering, isolation, filtering, separation, containment and/or containerization of the hydrogen resulting from and/or subsequent the reaction and comingled and/or immixed with other substances resulting from and/or subsequent the reaction, and/or products or by-products resulting from and/or subsequent the reaction. Although other products and/or by-products resulting or possibly resulting from and/or subsequent the reaction are a secondary benefit with regards to the process, method and device of this invention; this patent application is inclusive as to their potential beneficent use, and does not limit as to their potential beneficent use, when produced and/or derived from the process, method and device of this invention.

Moreover, the aforementioned manner and/or manners of physical arrangement (whether through contact or proximity), and/or union (whether through combination, bonding, mixture and/or fusion) of the iron with the microwave susceptor corresponding to the process, method and device of this invention, are a function of the amount of hydrogen produced, derived and/or required for end use. Accordingly, the manner and/or manners of physical arrangement (whether through contact or proximity), and/or union (whether through combination, bonding, mixture and/or fusion) of the iron with the microwave susceptor are variable, without limit, and combinable; as it is scalable to, and in tandem with, the amount of hydrogen produced, derived, and/or required for end use.

Also, with relation to the manner and/or manners of physical arrangement (whether through contact or proximity) and/or union (whether through combination, bonding, mixture and/or fusion) of the iron with the microwave susceptor corresponding to the process, method and device of this invention; an insulator material and/or a means of insulation, could, or would, minimize and/or dampen dissipation of radiant/ heat energy converted from microwave energy by the microwave susceptor; that is, retarding and/or confining the radiant/heat energy converted from microwave energy by the microwave susceptor; facilitating and/or enhancing alteration of the iron's physical characteristics; resulting in a potential improvement to the process, method and device of this invention. Conjointly, the insulator material and/or a means of insulation are variable, without limit, and combinable; as it is scalable to, and in tandem with, the manner and/or manners of physical arrangement (whether through contact or proximity), and/or union (whether through combination, bonding, mixture and/or fusion) of the iron with the microwave susceptor; which, in turn, is variable, without limit, and combinable; as it is scalable to, and in tandem with, the amount of hydrogen produced, derived, and/or required for end use.

Further, with relation to previously mentioned means and/or methods of channeling and/or directing water and its exposure or contact with the altered iron, the means and/or methods of channeling and/or directing water are variable, without limit, and combinable; as it is scalable to, and in tandem with, the amount of hydrogen produced, derived, and/or required for end use. Conjointly, and also with relation to previously mentioned means and/or methods of channeling and/or directing water and its exposure or contact with the altered iron; the means and/or methods of channeling and/or directing water are variable, without limit, and combinable; as it is scalable to, and in tandem with, the manner(s) of physical arrangement (whether through contact or proximity), and/or union (whether through combination, bonding, mixture and/or fusion) of the iron with the microwave susceptor; which, in turn, is variable, without limit, and combinable; as it is scalable to, and in tandem with, the amount of hydrogen produced, derived, and/or required for end use.

Also, the aforementioned reactants (water and iron) that produce and/or derive hydrogen will need to be replaced, replenished and/or resupplied, as they are consumed, modified and/or changed by the reaction resulting from the process, method and device of this invention. The technique(s), frequency, and extent of replacement, replenishment and/or resupply can range from partial, occasional and/or periodic substitution of either or both the reactants, to a continuous or semi-continuous shifting of either or both the reactants, may be of a chemical and/or mechanical nature, and are a function of the amount of hydrogen produced, derived, and/or required for end use. Accordingly, the technique(s), frequency, and extent of replacement, replenishment and/or resupply of the reactants that produce hydrogen are variable, without limit, and combinable; as it is scalable to, and in tandem with, the amount of hydrogen produced, derived, and/or required for end use.

Additionally, the reactant, water, undergoes a progressive change (such as, but not necessarily limited to the temperature of the water) upon exposure or contact with the altered iron; that is, changes to the water (such as, but not necessarily limited to the temperature of the water) occur as it is exposed to and/or or comes in contact with the altered iron. The progressive nature of the changes to the water, until it reaches a reactive threshold with the altered iron to produce and/or derive hydrogen, is indicative that a progressive preparation and/or pretreatment of the reactant, water, is inherent with process, method and device of this invention. Consequently, this invention also includes the progressive nature of the changes to the water (such as, but not necessarily limited to the temperature of the water) prior to it reaching a reactive threshold with the altered iron to produce and/or derive hydrogen via the process, method and device of this invention. Additionally, although other products and/or by-products resulting or possibly resulting from the progressive preparation and/or pretreatment of the reactant, water, are a secondary benefit with regards to the process, method and device of this invention; this patent application is inclusive as to their potential beneficent use, and does not limit as to their potential beneficent use, when produced and/or derived from the progressive preparation and/or pretreatment of the reactant, water, via the process, method and device of this invention. Conjointly, although the progressive preparation and/or pretreatment of the reactant, water, is inherent with the process, method and device of this invention, via exposure or contact of water with the altered iron; this invention also includes progressive preparation and/or pretreatment of the reactant, water, via exposure or contact of water with other materials with high thermal conductivities in lieu of iron, but similarly arranged; that is, said other materials in a manner and/or manners of physical arrangement (whether through contact and/or proximity) and/or union (whether through combination, bonding, mixture and/or fusion) with a microwave susceptor; so that when the microwave susceptor is sufficiently exposed to microwave energy, will alter said materials so that, water, upon exposure or contact with said altered materials, will, in turn, be changed (such as, but not necessarily limited to the change in temperature of the water) and a progressive preparation and/or pretreatment of the reactant, water, occurs facilitating and/or enhancing the subsequent reaction of the water and the iron to produce and/or derive hydrogen via the process, method and device of this invention. Concomitantly, with relation to the reactant, water, being changed (such as, but not necessarily limited to its temperature) and undergoing progressive preparation and/or pretreatment upon exposure or contact with said altered materials; this invention also includes the progressive nature of the changes to the water (such as, but not necessarily limited to the temperature of the water) prior and/or up to it reaching and/or achieving a reactive threshold with iron to produce and/or derive hydrogen via progressive preparation and/or pretreatment upon exposure or contact with said altered materials. Moreover, with relation to the reactant, water, being changed (such as, but not necessarily limited to its temperature) and undergoing progressive preparation and/or pretreatment upon exposure or contact with said altered materials; a means and/or methods shall be provided to subsequently channel and/or direct the changed, prepared and/or pretreated water for exposure or contact with the iron subjected to radiant/heat energy by way of a microwave susceptor sufficiently exposed to microwave energy via the process, method and device of this invention to produce and/or derive hydrogen. Additionally, although other products and/or by-products resulting or possibly resulting from the progressive preparation and/or pretreatment of the reactant, water, using other materials in lieu of iron are a secondary benefit with regards to the process, method and device of this invention; this patent application is inclusive as to their potential beneficent use, and does not limit as to their potential beneficent use, when produced and/or derived from the progressive preparation and/or pretreatment of the reactant, water, using other materials with high thermal conductivities in lieu of iron, via the process, method and device of this invention.

Moreover, the aforementioned manner and/or manners of physical arrangement (whether through contact or proximity), and/or union (whether through combination, bonding, mixture and/or fusion) of a microwave susceptor with materials facilitating and/or enhancing the subsequent reaction of the water and the iron via progressive preparation and/or pretreatment of the reactant, water; are a function of the amount of water to be prepared and/or pretreated for the subsequent reaction of the water and the iron to produce and/or derive hydrogen. Concomitantly, the manner and/or manners of physical arrangement (whether through contact or proximity), and/or union (whether through combination, bonding, mixture and/or fusion) of a microwave susceptor with materials facilitating and/or enhancing the subsequent reaction of the water and the iron via progressive preparation and/or pretreatment of the reactant, water, are variable, without limit, and combinable; as it is scalable to, and in tandem with, the manner and/or manners of physical arrangement (whether through contact or proximity), and/or union (whether through combination, bonding, mixture and/or fusion) of the iron with a microwave susceptor corresponding to the process, method and device of this invention; which, in turn, is a function of the amount of hydrogen produced, derived and/or required for end use.

Additionally, with relation to the manner and/or manners of physical arrangement (whether through contact or proximity), and/or union (whether through combination, bonding, mixture and/or fusion) of a microwave susceptor with materials facilitating and/or enhancing the subsequent reaction of the water and the iron via progressive preparation and/or pretreatment of the reactant, water; an insulator material and/or a means of insulation, could, or would, minimize and/or dampen dissipation of radiant/heat energy converted from microwave energy by the microwave susceptor; that is, retarding and/or confining the radiant/heat energy converted from microwave energy by the microwave susceptor; aiding and/or fostering alteration of said materials facilitating and/or enhancing the subsequent reaction of the water and the iron, and, conjointly, aiding and/or fostering the progressive preparation and/or pretreatment of the reactant, water; thereby facilitating and/or enhancing the subsequent reaction of the water and the iron corresponding to the process, method and device of this invention, as previously described; resulting in a potential improvement to the process, method and device of this invention. Concomitantly, the insulator material and/or a means of insulation are variable, without limit, and combinable; as it is scalable to, and in tandem with, the manner and/or manners of physical arrangement (whether through contact or proximity), and/or union (whether through combination, bonding, mixture and/or fusion) of a microwave susceptor with materials facilitating and/or enhancing the subsequent reaction of the water and the iron via progressive preparation and/or pretreatment of the reactant, water; which, in turn, the manner and/or manners of physical arrangement (whether through contact or proximity), and/or union (whether through combination, bonding, mixture and/or fusion) of a microwave susceptor with materials facilitating and/or enhancing the subsequent reaction of the water and the iron via progressive preparation and/or pretreatment of the reactant, water; is variable, without limit, and combinable; as it is scalable to, and in tandem with, the manner and/or manners of physical arrangement (whether through contact or proximity), and/or union (whether through combination, bonding, mixture and/or fusion) of the iron with a microwave susceptor corresponding to the process, method and device of this invention; which, in turn is a function of the amount of hydrogen produced, derived and/or required for end use.

Also, with relation to means and/or methods of channeling and/or directing water and its exposure or contact with materials facilitating and/or enhancing the subsequent reaction of the water and the iron via progressive preparation and/or pretreatment of the reactant, water; the means and/or methods of channeling and/or directing the water and its exposure or contact with said materials facilitating and/or enhancing the subsequent reaction of the water and the iron via progressive preparation and/or pretreatment of the reactant, water, are variable, without limit, and combinable; as it is scalable to, and in tandem with, manner and/or manners of physical arrangement (whether through contact or proximity), and/or union (whether through combination, bonding, mixture and/or fusion) of a microwave susceptor with materials facilitating and/or enhancing the subsequent reaction of the water and the iron via progressive preparation and/or pretreatment of the reactant, water. Moreover, the manner and/or manners of physical arrangement (whether through contact or proximity), and/or union (whether through combination, bonding, mixture and/or fusion) of a microwave susceptor with materials facilitating and/or enhancing the subsequent reaction of the water and the iron via progressive preparation and/or pretreatment of the reactant, water, are also variable, without limit, and combinable; as it is scalable to, and in tandem with, the manner and/or manners of physical arrangement (whether through contact or proximity), and/or union (whether through combination, bonding, mixture and/or fusion) of the iron with a microwave susceptor corresponding to the process, method and device of this invention; which, in turn, is a function of the amount of hydrogen produced, derived and/or required for end use.

Further, the materials facilitating and/or enhancing the subsequent reaction of the water and the iron via progressive preparation and/or pretreatment of the reactant, water; will need to be replaced, replenished and/or resupplied, as they are consumed, modified and/or changed due to their usage for the progressive preparation and/or pretreatment of the reactant, water. The technique(s), frequency, and extent of replacement, replenishment and/or resupply can range from partial, occasional and/or periodic substitution of the materials facilitating and/or enhancing the subsequent reaction of the water and the iron, to a continuous or semi-continuous shifting of the materials facilitating and/or enhancing the subsequent reaction of the water and the iron element, may be of a chemical and/or mechanical nature, and are a function of the amount of hydrogen produced, derived, and/or required for end use. Accordingly, the technique, frequency, and extent of replacement, replenishment and/or resupply of the materials facilitating and/or enhancing the subsequent reaction of the water and the iron element are variable, without limit, and combinable; as it is scalable to, and in tandem with, the amount of hydrogen produced, derived, and/or required for end use.

Further, although the microwave susceptor is not a reactant (that is, a reactant in the mode of the water and iron), its usage may subject it to permanent or temporary changes of its physical characteristics and/or chemical structure via the process, method and device of this invention; possibly resulting in diminishment of its capabilities to absorb and/or assimilate microwave energy and convert it to radiant/heat energy. Accordingly, the microwave susceptor may require replacement, replenishment and/or resupply, as it is consumed, modified and/or changed by its usage. The technique(s), frequency, and extent of replacement, replenishment and/or resupply can range from partial, occasional and/or periodic substitution of the microwave susceptor, to a continuous or semi-continuous shifting of the microwave susceptor.

GENERIC OUTLINES AND DESCRIPTIONS OF APPARATUS CONFIGURATIONS ILLUSTRATING OPERATING PRINCIPLES OF THE PROCESS, METHOD & DEVICE OF THIS INVENTION

Following—in outline form—are examples of simplified apparatus configurations that adhere to the process, method and device of this invention. The apparatus configurations described do not in any way attempt to delineate parameters as to possible apparatus configurations; nor are they restrictive as to other possible apparatus configurations. They are generic outlines of the components and/or elements of apparatus illustrating the operating principles of the process, method and device of this invention. Conjointly, dimensioning and sizing designation of the components and/or elements of the apparatus examples are not specified as they are a function of the amount of hydrogen to be produced, derived and/or required for end use; are relative to one another's dimensioning and sizing; and are limited by the interior volume of the cavity resonator. Moreover, the outline indicates, when applicable, associated causality and effect considerations, assembly options, and variants associated with the components, features, modes, and/or elements of the simplified apparatus configuration. The outline is organized by phases of operation of the apparatus. Apparatus A utilizes Silicon Carbide as the Microwave Susceptor. Apparatus B utilizes an Argon and Sulfur mixture as the Microwave Susceptor, contained and enclosed within a heat resistant, microwave transparent and/or permeable vessel within the confines of a cavity resonator. Apparatus C utilizes an Argon and Sulfur mixture as the Microwave Susceptor, contained and enclosed within a cavity resonator serving dually as the vessel containing and enclosing the Argon and Sulfur mixture utilized as Microwave Susceptor.

Apparatus A

Utilizing Silicon Carbide as the Microwave Susceptor 1.0 Irradiation Phase—This Phase involves two components and/or features; Microwave Oven and a Microwave Susceptor. The Microwave Oven irradiates the Microwave Susceptor with microwave energy; in turn the Microwave Susceptor converts the microwave energy to radiant/heat energy. Following is a narrative for each of the components and/or features; detailing their operative function, interface with each other, effect(s) and/or result(s), and other applicable considerations.

1.1 Microwave Oven—The metal walls of the oven form a cavity resonator. Microwaves being reflected off metal surfaces, would bounce off the wall to create a resonant effect of the microwaves. Microwave ovens are designed to create this effect. Its primary function is to irradiate the Microwave Susceptor (See 1.2 Following) with microwave energy. It is recommended the microwave oven have a rating of 850 Watts or greater. Modifications to the microwave oven would include:

1.1.1 Air exchange to the interior of the cavity resonator should be controlled and/or modulated for purposes of temperature control within the cavity resonator; and conjointly, for purposes of minimizing dissipation of radiant/heat energy converted from microwave energy by the Microwave Susceptor (See 1.2 Following). This would interface and is interdependent with the materials and/or substances with insulating properties generally shaped and conforming to the contours of the Microwave Susceptor that, when used, could, or would, minimize dissipation of radiant/heat energy converted from microwave energy by the Microwave Susceptor (See 1.2.1.2 Following).

1.1.1.1 There are a variety of methods for control and or modulation of the air exchange to the interior of the cavity resonator. Simplest manner would be to block, fully or partially, air circulation holes to the interior of the cavity resonator. Moreover, the blocking material should be unaffected by microwaves.

1.1.2 Openings or ports in the wall(s) of the cavity resonator for a water supply inlet and an outlet for Hydrogen comingled and/or immixed with other substances, products and/or by-products resulting from the reaction, and/or remaining after the reaction. The term "reaction", whenever used herein, with relation to this apparatus, whether in singular, plural or possessive form, refers to a fast reaction of the water and the element iron to produce and/or derive hydrogen. To explain, the water continues to heat beyond its saturation temperature to a temperature that permits a fast reaction with the element iron. Among the products of the reaction is hydrogen.

1.1.2.1 The locations of the openings or ports in the wall(s) of the cavity resonator should be coordinated to take advantage of the effect of gravity; that is, the water supply inlet should be at a high point relative the Helical or Looped Tubular Shape of Copper (See 2.2 Following) or the Helical or Looped Tubular Shape of Iron (See 3.3 Following), and the outlet for Hydrogen comingled and/or immixed with other substances, products and/or by-products resulting from the reaction, and/or remaining after the reaction should be at a low point relative the Helical or Looped Tubular Shape of Iron. The reference to "effect of gravity" or "gravity effect" whenever used herein, with relation to this apparatus is meant for a simplified assembly that will allow channeling and/or directing of the Water and/or the Hydrogen comingled and/or immixed with other substances, products and/or by-products resulting from the reaction, and/or remaining after the reaction. As such, the term "effect of gravity" implies a force, head, pressure, weight, and/or load that will channel and/or direct the Water and the Hydrogen comingled and/or immixed with other substances, products and/or by-products resulting from the reaction, and/or remaining after the reaction. Alternative means not relying fully and/or partially on gravity effect are feasible; accordingly, the means and/or methods of channeling and/or directing water are variable, without limit, and combinable.

1.1.2.1.1 Depending on their configuration, the Water supply inlet(s) and outlet(s) for the Hydrogen comingled and/or immixed with other substances, products and/or by-products resulting from the reaction, and/or remaining after the reaction from their corresponding openings or ports in the wall(s) of the cavity resonator to their points of connection to the Helical or Looped Tubular Shape of Copper and/or the Helical or Looped Tubular Shape of Iron may be subjected to microwave energy. Failure of the Water supply inlet(s) and outlet(s) for Hydrogen comingled and/or immixed with other substances, products and/or by-products resulting from the reaction, and/or remaining after the reaction, due to microwave energy exposure, need be averted through materials selected for the Water supply inlet(s) and outlet(s) for Hydrogen comingled and/or immixed with other substances, products and/or by-products resulting from the reaction, and/or remaining after the reaction that are unaffected or sufficiently unaffected by microwaves so as to avoid their failure when subjected to microwave energy in the event their configuration subjects them to microwave energy. Also, the use of screening to act as a Faraday Cage and protect the Water supply inlet(s) and outlet(s) for Hydrogen comingled and/or immixed with other substances, that is, to channel Microwave energy away from them is an available alternative to limit or eliminate their subjection to microwave energy.

1.1.2.1.2 A further consideration related to the Water supply inlet(s) and outlet(s) for Hydrogen comingled and/or immixed with other substances, products and/or by-products resulting from the reaction, and/or remaining after the reaction, and their corresponding openings or ports in the wall(s) of the cavity resonator is microwave leakage. They should be configured, sized and/or coordinated to eliminate or substantially limit microwave leakage. Also, the use of screening at the locations of the corresponding openings or ports in the wall(s) of the cavity resonator to act as a Faraday Cage, that is, to channel Microwave energy away from the zone of the opening is an available alternative to limit microwave leakage.

1.2 Microwave Susceptor—A material or combination of materials capable of absorbing and/or assimilating microwave energy and converting it to radiant/heat energy. For purposes of this simplified apparatus Silicon Carbide is used, provided it is shaped and conformed to the contours of the Helical or Looped Tubular Shape of Copper (See 2.2 Following) and/or the Helical or Looped Tubular Shape of Iron (See 3.3 Following).

1.2.1 The conversion by the Microwave Susceptor of microwave energy to radiant/heat energy; and its ability to transfer radiant/heat energy to the Helical or Looped Tubular Shape of Copper (See 2.0 Following) and/or the Helical or Looped Tubular Shape of Iron (See 3.0 Following) are not completely efficient.

1.2.1.1 Unabsorbed microwave energy will cause the microwave oven's magnetron to overheat. No load or under load operation of the microwave oven (that is, excessive unabsorbed microwave energy) would ultimately damage the magnetron. The intensity of standing waves can cause arcing through reflection. Sustained arcing will affect and damage the magnetron. Accordingly, the microwave susceptor should also serve as an energy sink for excess microwave energy. Use of a Ferrite Isolator, preferably water cooled, would help prevent damage to the magnetron by microwave power reflected back into the waveguide. The ferrite isolator absorbs reflected power. Microwave ovens have a built-in waveguide, but adapting a ferrite isolator to the confines of a microwave oven as utilized for purposes of the apparatus described herein would essentially require its rebuilding. As such, it would be more practicable to construct a waveguide and cavity resonator assembly, whereby the ferrite isolator could be inserted in the waveguide between the microwave generating device (typically a magnetron, but a klystron is also a microwave generating device) and the cavity resonator.

1.2.1.2 There are a variety of materials and/or substances with insulating properties that could, or would, minimize dissipation of radiant/heat energy converted from microwave energy by the Microwave Susceptor. Insulating materials and/or substances should be generally shaped and conform to the contours of the Microwave Susceptor.

1.2.1.2.1 Dependent on the material(s) and/or substance(s) used for insulation of the Microwave Susceptor it may be necessary it not contact other heated surfaces of the apparatus due to the material(s) and/or substance(s) physical property limits (such as, but not necessarily limited to temperature). This entails physical isolation of the Microwave Susceptor Insulator, that is, it be supported in such a way it not contact or minimally contact other heated surfaces; particularly the Microwave Susceptor, and/or the Helical or Looped Tubular Shape of Copper, and/or the Helical or Looped Tubular Shape of Iron. The Microwave Susceptor Insulator, however, must remain proximate enough to the Microwave Susceptor to maintain and/or preserve its intended insulator properties and/or functions.

2.0 Water Pretreatment Phase (Optional)—This Phase is optional. It involves three components and/or features; Microwave Susceptor, a Helical or Looped Tubular Shape of Copper, and Water. The Microwave Susceptor transfers and/or imparts radiant/heat energy to the Helical or Looped Tubular Shape of Copper (See 2.2 Following) and alters the copper's physical characteristics (such as, but not necessarily limited to its temperature). Water supplied to the interior of the Helical or Looped Tubular Shape of Copper upon exposure or contact with the altered copper, will in turn, have its physical characteristics altered (such as, but not necessarily limited to the water's temperature). It is the use of the Helical or Looped Tubular Shape of Copper to alter the water's physical characteristics (such as, but not necessarily limited to the water's temperature) that defines the optional nature of this phase. Though the Microwave Susceptor and Water are necessary components and/or features for the apparatus, the use of Helical or Looped Tubular Shape of Copper only serves to precondition the water prior to the Reactive Stage (See 3.0 Following). Moreover, though copper is cited, materials with thermal conductivity higher than iron may be used in lieu of copper. Following is a narrative for each of the components and/or features; detailing their operative function, interface with each other, effect(s) and/or result(s), and other applicable considerations.

2.1 Microwave Susceptor—A material capable of absorbing and/or assimilating microwave energy and converting it to radiant/heat energy. (See 1.2 Prior) For purposes of this simplified apparatus Silicon Carbide as microwave susceptor is used.

2.1.1 Microwave Susceptor transfers radiant/heat heat to the Helical or Looped Tubular Shape of Copper and alters the copper's physical characteristics (such as, but not necessarily limited to its temperature).

2.2 Helical or Looped Tubular Shape of Copper—Water supplied to the interior of the Helical or Looped Tubular Shape of Copper upon exposure or contact with the altered copper, will in turn, have its physical characteristics altered (such as, but not necessarily limited to the water's temperature). A Helical or Looped Tubular Shape is recommended to increase exposure surface of the copper to water, the time of the exposure, and to allow for expansion and contraction of the copper.

2.2.1 The copper due to its thermal conductivity pretreats the water and facilitates the water's subsequent reaction with iron to produce and/or derive hydrogen.

2.2.1.1 The Helical or Looped Tubular Shape of Copper connects to the Helical or Looped Tubular Shape of Iron and conduits the pretreated water to the interior of the Helical or Looped Tubular Shape of Iron. (See 3.3 Following) A flexible connection is recommended between the Helical or Looped Tubular Shape of Copper and the Helical or Looped Tubular Shape of Iron to allow for expansion and contraction differences between dissimilar materials. Ideally, the flexible connection material(s) will be unaffected or sufficiently unaffected by microwaves so as to avoid their failure when subjected to microwave energy in the event the apparatus configuration subjects them to microwave energy. Also, the use of screening to act as a Faraday Cage and protect the flexible connection, that is, to channel Microwave energy away from it, is an additional available alternative to limit or eliminate its subjection to microwave energy.

2.3 Water—Supplied via a connecting inlet into the Helical or Looped Tubular Shape of Copper through openings or ports in the walls of the cavity resonator. (See 1.1.2 Prior)

2.3.1 The Water would flow down via gravity effect into the Helical or Looped Tubular Shape of Copper. (See 1.1.2.1 Prior)

2.3.1.1 The Water must exert sufficient pressure to enter into and circuit through the Helical or Looped Tubular Shape of Copper and into the Helical or Looped Tubular Shape of Iron connecting to it. (See 3.2 Following).

2.3.1.1.1 Use of a reservoir vessel of Water anterior the Water supply inlet(s) connecting into the Helical or Looped Tubular Shape of Copper would assist in raising its pressure and steady its flow, facilitating its entry and circuiting through the Helical or Looped Tubular Shape of Copper and into the Helical or Looped Tubular Shape of Iron connecting to it.

3.0 Reactive Phase—This Phase involves three components and/or features; Microwave Susceptor, a Helical or Looped Tubular Shape of Iron, and Water. The Microwave Susceptor transfers and/or imparts radiant/heat energy to the Helical or Looped Tubular Shape of Iron and alters the iron's physical characteristics (such as, but not necessarily limited to its temperature). Water supplied to the interior of the Helical or Looped Tubular Shape of Iron upon exposure or contact with the altered iron, will in turn, have its physical characteristics altered (such as, but not necessarily limited to the water's temperature) and result in a reaction of the water and the iron to produce and/or derive Hydrogen. Following is a narrative for each of the components and/or features; detailing their operative function, interface with each other, effect(s) and/or result(s), and other applicable considerations.

3.1 Microwave Susceptor—A material capable of absorbing and/or assimilating microwave energy and converting it to radiant/heat energy. (See 1.2 Prior) For purposes of this simplified apparatus Silicon Carbide as microwave susceptor is used.

3.1.1 Microwave Susceptor transfers radiant/heat heat to the Helical or Looped Tubular Shape of Iron and alters the Iron's physical characteristics (such as, but not necessarily limited to its temperature).

3.2 Helical or Looped Tubular Shape of Iron—Water supplied to the interior of the Helical or Looped Tubular Shape of Iron upon exposure or contact with the altered iron, will in turn, have its physical characteristics altered (such as, but not necessarily limited to the water's temperature). A Helical or Looped Tubular Shape is recommended to increase exposure surface of the iron to water or pretreated water, the time of the exposure, and to allow for expansion and contraction of the iron.

3.2.1 The interior of the Helical or Looped Tubular Shape of Iron will serve as the reaction site of the water and iron.

3.2.2 The Helical or Looped Tubular Shape of Iron will also conduit the Hydrogen comingled and/or immixed with other substances, products and/or by-products resulting from the reaction, and/or remaining after the reaction.

3.2.2.1 The Helical or Looped Tubular Shape of Iron will connect to a Helical or Looped Tubular Shape of Copper (See 4.2 Following) immersed in a Condensing Vessel. The connecting outlet from the Helical or Looped Tubular Shape of Iron into the Helical or Looped Tubular Shape of Copper immersed in the Condensing Vessel will traverse the wall of the cavity resonator. (See 1.1.2 Prior) Methods to protect the outlet(s) and associated opening(s) or port(s) from failure due to microwave energy, and to eliminate or substantially limit microwave leakage through the openings or ports are previously described (See 1.1.2.1.1 and 1.1.2.1.2 Prior)

3.3 Water or Pretreated Water—Water would be supplied via a connecting inlet into the Helical or Looped Tubular Shape of Iron through openings or ports in the walls of the cavity resonator (See 1.1.2 Prior); or, if the optional Water Pretreatment Phase is implemented, Pretreated Water will be conducted from the Helical or Looped Tubular Shape of Copper (See 2.2.1.1 Prior) connecting to the Helical or Looped Tubular Shape of Iron. Methods to protect the water inlets and associated openings or ports from failure due to microwave energy, and to eliminate or substantially limit microwave leakage through the openings or ports are previously described (See 1.1.2.1.1 and 1.1.2.1.2 Prior).

3.3.1 The Water would flow down via gravity effect into the Helical or Looped Tubular Shape of Iron.

3.3.1.1 The Water must exert sufficient pressure to enter into and circuit through the Helical or Looped Tubular Shape of Iron; or, if the optional Water Pretreatment Phase is implemented, the Pretreated Water must exert sufficient pressure to enter into and circuit through the Helical or Looped Tubular Shape of Copper and into the Helical or Looped Tubular Shape of Iron connecting to it. (See 2.3.1.1 Prior)

3.3.1.1.1 Use of a reservoir vessel of Water anterior the Water supply inlet(s) connecting into the Helical or Looped Tubular Shape of Iron; or, if the optional Water Pretreatment Phase is implemented, use of a reservoir vessel of Water anterior the Water supply inlet(s) connecting into the Helical or Looped Tubular Shape of Copper (See 2.3.1.1.1 Prior), would assist in raising its pressure and steady its flow, facilitating its entry and circuiting through the Helical or Looped Tubular Shape of Iron; or, if the optional Water Pretreatment Phase is implemented, facilitating its entry and circuiting through the Helical or Looped Tubular Shape of Copper and into the Helical or Looped Tubular Shape of Iron connecting to it.

4.0 Condensation Phase—This Phase occurs outside the confines of the cavity resonator (See 1.1 Prior), and involves two components and/or features; Coolant Vessel and a Helical or Looped Tubular Shape of Copper. The Coolant Vessel contains a coolant. The Helical or Looped Tubular Shape of Copper is immersed in the coolant. The Hydrogen comingled and/or immixed with other substances, products and/or by-products resulting from the reaction, and/or remaining after the reaction will be fed into and circuit through the Helical or Looped Tubular Shape of Copper immersed in the coolant (See 3.2.2.1 Prior). Heat exchange occurs through the wall of the Helical or Looped Tubular Shape of Copper; whereby energy is transferred between the Hydrogen comingled and/or immixed with other substances, products and/or by-products resulting from the reaction, and/or remaining after the reaction, and the coolant; resulting in a separation process of the Hydrogen, and other substances, products and/or by-products resulting from the reaction, and/or remaining after the reaction that are comingled and/or immixed with the Hydrogen. The condensation process via heat exchange with water as coolant as described is a simplified assembly. Alternative means for achieving the separation process of the Hydrogen, and other substances, products and/or by-products resulting from the reaction, and/or remaining after the reaction that are comingled and/or immixed with the Hydrogen are available; accordingly, the means and/or methods of achieving the separation process are variable, without limit, and combinable.

4.1 Coolant Vessel—The Coolant Vessel would contain the coolant fluid; the Helical or Looped Tubular Shape of Copper is immersed in the coolant fluid (See 4.2 Following). There are a variety of substances with properties that could, or would, serve as a coolant. For purposes of this simplified apparatus, water may be used. Considerations regarding the configuration of the Coolant Vessel would include:

4.1.1 Openings or ports in the wall(s) of the Coolant Vessel to allow an inlet for conducting Hydrogen comingled and/or immixed with other substances, products and/or by-products resulting from the reaction, and/or remaining after the reaction from the Helical or Looped Tubular Shape of Iron to the Helical or Looped Tubular Shape of Copper; and openings or ports in the wall(s) of the Coolant Vessel to allow an outlet for conducting Hydrogen, and other substances, products and/or by-products resulting from the reaction, and/or remaining after the reaction that are comingled and/or immixed with the Hydrogen subsequent the separation process.

4.1.1.1 The elevation of the Coolant Vessel and the locations of the openings or ports in the wall(s) of the Coolant Vessel should be coordinated to take advantage of the effect of gravity.

4.1.1.1.1 The outlet for conducting Hydrogen comingled and/or immixed with other substances, products and/or by-products resulting from the reaction, and/or remaining after the reaction from the Helical or Looped Tubular Shape of Iron, should be at a higher point relative the inlet for conducting Hydrogen comingled and/or immixed with other substances, products and/or by-products resulting from the reaction, and/or remaining after the reaction to the Helical or Looped Tubular Shape of Copper immersed in the coolant fluid (See 3.2.2.1 Prior).

4.1.1.1.2 The outlet for conducting from the Helical or Looped Tubular Shape of Copper immersed in the coolant fluid, after the separation process of the Hydrogen, and other substances, products and/or by-products resulting from the reaction, and/or remaining after the reaction that are comingled and/or immixed with the Hydrogen should be at a lower point relative the inlet for conducting Hydrogen comingled and/or immixed with other substances, products and/or by-products resulting from the reaction, and/or remaining after the reaction from the Helical or Looped Tubular Shape of Iron conducting Hydrogen comingled and/or immixed with other substances, products and/or by-products resulting from the reaction, and/or remaining after the reaction to the Helical or Looped Tubular Shape of Copper immersed in the coolant fluid.

4.1.2 The Coolant Vessel should be open at the top to the atmosphere to allow evaporative cooling of the water as coolant; the more energetic water molecules in the coolant vessel escape through the open top taking away heat cooling the balance of the water in the Coolant Vessel. The reference to "evaporative cooling" wherein water is used as coolant, resulting in a separation process via condensation of the Hydrogen, and other substances, products and/or by-products resulting from the reaction, and/or remaining after the reaction that are comingled and/or immixed with the Hydrogen; is for a simplified assembly that will allow the separation process. Alternative means not relying fully and/or partially on condensation using water as coolant are feasible; accordingly, the means and/or methods of separation of the Hydrogen, and other substances, products and/or by-products resulting from the reaction, and/or remaining after the reaction that are comingled and/or immixed with the Hydrogen, are variable, without limit, and combinable.

4.1.2.1 Due to the evaporative cooling process, water loss will occur and must be compensated; a water make-up system is necessary. It is recommended a simple floater system be used that detects the drop in water level inside the Coolant Vessel and triggers a valve or valves to open and provide feed water from a reservoir vessel, a feed line, or a water replenishment method combining both; that is, a reservoir vessel and a feed line.

4.1.2.1.1 The dimension and size of the coolant vessel; that is, its proportions, must be balanced between the requirements of the evaporative cooling and floater system assembly.
    4.1.2.1.1.1 For convenience when emptying, it is recommended a drain valve be provided at or near the bottom of the Coolant Vessel.

4.2 Helical or Looped Tubular Shape of Copper—The Helical or Looped Tubular Shape of Copper is immersed in the water as coolant within the Coolant Vessel. (See 4.1 Prior) Hydrogen comingled and/or immixed with other substances, products and/or by-products resulting from the reaction, and/or remaining after the reaction will be conducted from the Helical or Looped Tubular Shape of Iron to the Helical or Looped Tubular Shape of Copper (See 3.2.2.1 and 4.1.1.1.1 Prior). A Helical or Looped Tubular Shape is recommended to increase exposure surface of the copper to Hydrogen comingled and/or immixed with other substances, products and/or by-products resulting from the reaction, and/or remaining after the reaction, the time of the exposure, and to allow for expansion and contraction of the copper. Also, a flexible connection from the Helical or Looped Tubular Shape of Iron to the Helical or Looped Tubular Shape of Copper is recommended to allow for expansion and contraction differences between dissimilar materials.

4.2.1 The copper due to its thermal conductivity initiates a separation process of the Hydrogen, and other substances, products and/or by-products resulting from the reaction, and/or remaining after the reaction that are comingled and/or immixed with the Hydrogen, via the removal of energy.

4.2.1.1 Heat exchange occurs through the wall of the Helical or Looped Tubular Shape of Copper; whereby energy is transferred between the water as coolant, and the Hydrogen and other comingled and/or immixed substances, products and/or by-products, resulting from the reaction, and/or remaining after the reaction.

4.2.1.2 The Helical or Looped Tubular Shape of Copper connects to a Sealed Vessel (See 5.1 Following) wherein the Hydrogen, and other substances, products and/or by-products resulting from the reaction, and/or remaining after the reaction that are comingled and/or immixed with the Hydrogen having undergone separation are collected.

5.0 Hydrogen Isolation Phase—This Phase involves two components and/or features; a Sealed Vessel and a Siphon Line. The Hydrogen, and other substances, products and/or by-products resulting from the reaction, and/or remaining after the reaction that are comingled and/or immixed with the Hydrogen having undergone separation are collected in the Sealed Vessel. The Sealed Vessel is connected to the Helical or Looped Tubular Shape of Copper immersed in the Coolant Vessel (See 4.2 Prior). During collection, that is, as the separated Hydrogen, and other substances, products and/or by-products resulting from the reaction, and/or remaining after the reaction that are comingled and/or immixed with the Hydrogen are drained into the Sealed Vessel from the Helical or Looped Tubular Shape of Copper immersed in the Coolant Vessel; the lighter substances being gaseous and/or vaporous rise to the top of the Sealed Vessel. A Siphon Line from the top of the Sealed Vessel would conduit off the gases and vapors. Among the gases would be Hydrogen; the lightest of the gases. The isolation process as described is a simplified assembly. Alternative means for achieving the isolation of Hydrogen, and other substances, products and/or by-products resulting from the reaction, and/or remaining after the reaction that are comingled and/or immixed with the Hydrogen are available; accordingly, the means and/or methods of achieving the isolation process are variable, without limit, and combinable. The reference to "collected in the Sealed Vessel" wherein the Hydrogen, and other substances, products and/or by-products resulting from the reaction, and/or remaining after the reaction that are comingled and/or immixed with the Hydrogen having undergone separation are retained; is for a simplified assembly that will allow the separation process. Alternative means are feasible for isolation and collection; accordingly, the means and/or methods of isolating and collecting the Hydrogen, and other substances, products and/or by-products resulting from the reaction, and/ or remaining after the reaction that are comingled and/or immixed with the Hydrogen, are variable, without limit, and combinable.

5.1 Sealed Vessel—The Sealed Vessel collects the separated Hydrogen, and other substances, products and/or by-products resulting from the reaction, and/or remaining after the reaction that are comingled and/or immixed with the Hydrogen. Considerations regarding the configuration of the Sealed Vessel would include:

5.1.1 The elevation of the Sealed Vessel and the locations of the openings or ports near the top of the Sealed Vessel should be coordinated to take advantage of the effect of gravity; openings or ports at or near the top of the Sealed Vessel to allow:

5.1.1.1 The inlet for conducting Hydrogen comingled and/or immixed with other substances, products and/or by-products resulting from the reaction, and/or remaining after the reaction from the Helical or Looped Tubular Shape of Copper immersed in the Coolant Vessel to the Sealed Vessel, should be at a lower point relative the outlet for conducting Hydrogen comingled and/or immixed with other substances, products and/or by-products resulting from the reaction, and/or remaining after the reaction from the Helical or Looped Tubular Shape of Copper immersed in the Coolant Vessel to the Sealed Vessel. (See 4.1.1.1.2 Prior)

5.1.1.2 An outlet for a Siphon Line to conduit off the gases and vapors. (See 5.2 Following)

5.1.2 For convenience, it is recommended a drain valve be provided near bottom of the Coolant Vessel for non-gaseous and/or non-vaporous substances, products and/or by-products resulting from the reaction.

5.2 Siphon Line—Conduits off the gases and vapors; including Hydrogen, the lightest gas. Considerations regarding the configuration of the Siphon Line would include:

5.2.1 Connects to the near top of the Sealed Vessel.

5.2.1.1 Direction of line leads upwards and of sufficient length to a allow Other Substances in vapor remaining immixed with the Hydrogen to condense onto interior of Piping and flow back into Sealed Vessel; or remain unmixed with the Hydrogen within the line.

5.2.1.1.1 Line would tie in with a hydrogen collection system and/or method.

6.0 Hydrogen Collection Phase—Components and/or features are not specified for this stage as a variety of systems and/or methods exist for collecting gas. Hydrogen, being the lightest gas, can be accumulated via upward delivery into a chamber; or the upward delivery may be coupled with an over water or pneumatic trough method wherein water is displaced within the chamber as gas accumulates (very workable as Hydrogen is sparingly soluble in water). Regardless, no final specification for gas collection is proposed; for purposes of this simplified apparatus upward delivery into a chamber coupled with an over water or pneumatic trough method would serve. It is noted however, that alternate means for Hydrogen Collection are feasible; accordingly, the means and/or methods of collecting the Hydrogen are variable, without limit, and combinable.

Apparatus B

Utilizing an Argon and Sulfur Mixture as the Microwave Susceptor, Contained and Enclosed within a Heat Resistant, Microwave Transparent and/or Permeable Vessel within the Confines of a Cavity Resonator 1.0 Irradiation Phase—This Phase involves two components and/or features; Microwave Oven and a Microwave Susceptor. The Microwave Oven irradiates the Microwave Susceptor with microwave energy; in turn the Microwave Susceptor converts the microwave energy to radiant/heat energy. Following is a narrative for each of the components and/or features; detailing their operative function, interface with each other, effect(s) and/or result(s), and other applicable considerations.

1.1 Microwave Oven—The metal walls of the oven form a cavity resonator. Microwaves being reflected off metal surfaces, would bounce off the wall to create a resonant effect of the microwaves. Microwave ovens are designed to create this effect. Its primary function is to irradiate the Microwave Susceptor (See 1.2 Following) with microwave energy. It is recommended the microwave oven have a rating of 850 Watts or greater. Modifications to the microwave oven would include:

1.1.1 Air exchange to the interior of the cavity resonator should be controlled and/or modulated for purposes of temperature control within the cavity resonator; and conjointly, if required, to assist in maintaining the physical and structural integrity of the vessel within the confines of the cavity resonator containing and enclosing the Argon and Sulfur mixture utilized as Microwave Susceptor (See 1.2 Following) by aiding to reduce heat buildup of the vessel See (1.2.1.2.1 Following), and conjointly, if required, to assist in minimizing excessive dissipation from the vessel of radiant/heat energy converted from microwave energy by the Argon and Sulfur mixture utilized as Microwave Susceptor within the vessel.

1.1.1.1 There are a variety of methods for control and or modulation of the air exchange to the interior of the cavity resonator. Simplest manner would be to block, fully or partially, air circulation holes to the interior of the cavity resonator. Moreover, the blocking material should be unaffected by microwaves.

1.1.2 Openings or ports in the wall(s) of the cavity resonator for a water supply inlet and an outlet for Hydrogen comingled and/or immixed with other substances, products and/or remaining after the reaction. The term "reaction", whenever used herein, with relation to this apparatus, whether in singular, plural or possessive form, refers to a fast reaction of the water and the element iron to produce and/or derive hydrogen. To explain, the water continues to heat beyond its saturation temperature to a temperature that permits a fast reaction with the element iron. Among the products of the reaction is hydrogen.

1.1.2.1 The locations of the openings or ports in the wall(s) of the cavity resonator should be coordinated to take advantage of the effect of gravity; that is, the water supply inlet should be at a high point relative the Helical or Looped Tubular Shape of Copper (See 2.2 Following) or the Helical or Looped Tubular Shape of Iron (See 3.3 Following), and the outlet for Hydrogen comingled and/or immixed with other substances, products and/or by-products resulting from the reaction, and/or remaining after the resulting from the reaction resulting from the reaction should be at a low point relative the Helical or Looped Tubular Shape of Iron. The reference to "effect of gravity" or "gravity effect" whenever used herein, with relation to this apparatus is meant for a simplified assembly that will allow channeling and/or directing of the Water and/or the Hydrogen comingled and/or immixed with other substances, products and/or by-products resulting from the reaction, and/or remaining after the reaction. As such, the term "effect of gravity" implies a force, head, pressure, weight, and/or load that will channel and/or direct the Water and the Hydrogen comingled and/or immixed with other substances, products and/or by-products resulting from the reaction, and/or remaining after the reaction. Alternative means not relying fully and/or partially on gravity effect are feasible; accordingly, the means and/or methods of channeling and/or directing water are variable, without limit, and combinable.

1.1.2.1.1 Depending on their configuration, the Water supply inlet(s) and outlet(s) for the Hydrogen comingled and/or immixed with other substances, products and/or by-products resulting from the reaction, and/or remaining after the reaction from their corresponding openings or ports in the wall(s) of the cavity resonator to their points of connection to the Helical or Looped Tubular Shape of Copper and/or the Helical or Looped Tubular Shape of Iron may be subjected to microwave energy. Failure of the Water supply inlet(s) and outlet(s) for Hydrogen comingled and/or immixed with other substances, products and/or by-products resulting from the reaction, and/or remaining after the reaction, due to microwave energy exposure, need be averted through materials selected for the Water supply inlet(s) and outlet(s) for Hydrogen comingled and/or immixed with other substances, products and/or by-products resulting from the reaction, and/or remaining after the reaction, that are unaffected or sufficiently unaffected by microwaves so as to avoid their failure when subjected to microwave energy in the event their configuration subjects them to microwave energy. Also, the use of screening to act as a Faraday Cage and protect the Water supply inlet(s) and outlet(s) for Hydrogen comingled and/or immixed with other substances, that is, to channel Microwave energy away from them, is an available alternative to limit or eliminate their subjection to microwave energy.

1.1.2.1.2 A further consideration related to the Water supply inlet(s) and outlet(s) for Hydrogen comingled and/or immixed with other substances, products and/or by-products resulting from the reaction, and/or remaining after the reaction, and their corresponding openings or ports in the wall(s) of the cavity resonator is microwave leakage. They should be configured, sized and/or coordinated to eliminate or substantially limit microwave leakage. Also, the use of screening at the locations of the corresponding openings or ports in the wall(s) of the cavity resonator to act as a Faraday Cage, that is, to channel Microwave energy away from the zone of the opening is an available alternative to limit microwave leakage.

1.2 Microwave Susceptor—A material or combination of materials capable of absorbing and/or assimilating microwave energy and converting it to radiant/heat energy. For purposes of this simplified apparatus a mixture utilizing Argon and Sulfur as microwave susceptor is used, provided it is contained, sealed and enclosed in a vessel within the confines of the cavity resonator. (See 1.1 Prior) that is generally transparent to, or permeable by microwaves so as to allow the Argon and Sulfur mixture be irradiated by microwaves. The vessel should also be configured to enclose within it the Helical or Looped Tubular Shape Copper (See 2.2 Following) and/or the Helical or Looped Tubular Shape of Iron (See 3.3 Following) so as to expose them to, and be enveloped by the mixture of Argon and Sulfur contained, sealed and enclosed within the vessel. The use of Argon and Sulfur as a microwave susceptor is observable in Sulfur Lamp technology. To explain, a Sulfur Lamp's mode of operation is based on enclosing a mixture of Argon and Sulfur in a quartz bulb and subjecting it to microwave energy. In fact, the magnetron utilized to generate the microwaves is the same as those found in a typical microwave oven. The microwave energy excites the Argon gas; in turn, the Argon gas heats the Sulfur to a high temperature and a glowing plasma results. The high temperature considerations, requires the quartz bulb be spun rapidly and air be circulated to cool the bulb and avoid its meltdown. The temperature characteristics are extreme; and are the applicable property for purposes of the apparatus configuration illustrating operating principles of the process, method & device of this invention. Within the bulb (typically 1¼ inches in diameter), a temperature of 727 Celsius has been measured at the outside of the plasma, and estimated to be 3726 Celsius at its center. The capability to assimilate microwave energy and convert it to radiant/heat energy demonstrated in the mode of operation of the Sulfur Lamp serve for purposes of the apparatus described herein. There are other notable characteristics related to the mode of operation of the Sulfur Lamp. The design life of the bulb is about 60,000 hours; signifying the Argon and Sulfur mixture as used would outlast the magnetron with a design life of 10,000 to 15,000 hours. The following expands on a qualitative basis on the performance considerations and design parameters related to the vessel containing, sealing in, and enclosing the Argon and Sulfur mixture, and efficiency issues associated with microwave energy conversion to radiant/heat energy:

1.2.1 The listed performance considerations and design parameters of the vessel have to be counterbalanced with the other performance considerations and design parameters so as to not nullify them individually and/or collectively.

1.2.1.1 Transparency and/or Permeability by Microwaves—The vessel must be fabricated of a material that is pervious by microwaves so as to allow the Argon and Sulfur mixture contained within it to be subjected to microwaves.

1.2.1.2 Heat Resistance—The vessel should be capable of physically and structurally withstanding the temperatures generated by the reaction of Argon and Sulfur mixture when subjected to microwaves. The heat resistance of the vessel is a function not only of its material composition; and may be integrated with other methods to bolster the vessel's heat resistance capacity. Aside from controlling and/or modulating air exchange to the interior of the cavity resonator to assist in maintaining the physical and structural integrity of the vessel within the confines of the cavity resonator containing and enclosing the Argon and Sulfur mixture (See 1.1.1 Prior), other options are available:

1.2.1.2.1 The Argon and Sulfur concentrations within the vessel may be adjusted to control and affect the temperature generated within the vessel. The Argon and Sulfur concentrations within the vessel may be homogeneously or selectively distributed. Maintaining a relatively uniform distribution of the Argon and Sulfur mixture within the vessel may require a mechanical means of agitation (for example, a vibratory method).

1.2.1.2.2 The cycling of the magnetron may be adjusted to control the extent of microwave irradiation of the Argon and Sulfur mixture within the vessel. This is a common feature of conventional microwave ovens; the power setting reduces the amount of radiation by cycling a constant-output magnetron on and off for varying lengths of time.

1.2.1.2.3 The vessel may be enveloped by a secondary wall so as to provide a cavity to contain a coolant that will envelop it. It will be necessary coolant supply inlet(s) and exit outlet(s) be provided to the cavity to allow replacement, replenishment, and/or resupply of the coolant as it is consumed, modified and/or changed through its usage. Further, associated openings or ports in the wall(s) of the cavity resonator will need to be provided for the coolant supply inlet(s) and exit outlet(s). Additionally, this configuration will require the secondary wall and coolant to be transparent to, and/or permeable by microwaves in the same manner as the vessel (See 1.2.1.1 Prior) so as to allow the Argon and Sulfur mixture contained within the vessel be subjected to microwaves. Moreover, the coolant supply inlet(s) and exit outlet(s) will be required to be of materials that are unaffected or sufficiently unaffected by microwaves so as to avoid their failure when subjected to microwave energy, and/or protected via use of screening to act as a Faraday Cage in the event their configuration subjects them to microwave energy. A further consideration related to the openings or ports in the wall(s) of the cavity resonator provided for the coolant supply inlet(s) and exit outlet(s) is microwave leakage. They should be configured, sized and/or coordinated to eliminate or substantially limit microwave leakage. Also, the use screening at the locations of the corresponding openings or ports in the wall(s) of the cavity resonator to act as a Faraday Cage, that is, to channel Microwave energy away from the zone of the opening is an available alternative to limit microwave leakage.

1.2.1.3 Sizing and Configuration—The vessel's sizing and configuration parameters are as follows:

1.2.1.3.1 It is recommended the overall volume of the vessel range from one quarter to one third of the internal volume of the microwave oven's cavity resonator; and that it be placed at center or near center of the cavity resonator.

1.2.1.3.2 The vessel encloses the Helical or Looped Tubular Shape Copper (See 2.2 Following) and/or the Helical or Looped Tubular Shape of Iron (See 3.3 Following). The dimensions and sizing of the Helical or Looped Tubular Shape Copper and/or the Helical or Looped Tubular Shape of Iron are not specified as they are a function of the amount hydrogen to be produced, derived and/or required for end use; and the internal volume capacity of the vessel. Accordingly, the vessel size is scalable to, and in tandem with, the dimensions and sizing of the Helical or Looped Tubular Shape Copper and/or the Helical or Looped Tubular Shape of Iron; and, conjointly, the dimensions and sizing of the Helical or Looped Tubular Shape Copper and/or the Helical or Looped Tubular Shape of Iron are scalable to, and in tandem with, the internal volume capacity of the vessel.

1.2.1.3.2.1 The use of the Helical or Looped Tubular Shape Copper is optional (See 2.2 Following); as such it may not be necessary to consider its inclusion as a part of the described apparatus. If included, however, another design consideration as to configuration would apply. Depending on volume considerations within the cavity resonator; the Helical or Looped Tubular Shape Copper could be placed in a separate sealed vessel. Additionally, the Helical or Looped Tubular Shape Copper will have to connect to the Helical or Looped Tubular Shape of Iron through the walls of the separate sealed vessels containing them. Other performance and design parameters related to the connection would be applicable (See 2.2.1.1 Following).

1.2.2 The conversion by the Microwave Susceptor of microwave energy to radiant/heat energy; and its ability to transfer radiant/heat energy to the Helical or Looped Tubular Shape of Copper (See 2.0 Following) and/or the Helical or Looped Tubular Shape of Iron (See 3.0 Following) are not completely efficient.

1.2.2.1 Unabsorbed microwave energy will cause the microwave oven's magnetron to overheat. No load or under load operation of the microwave oven (that is, excessive unabsorbed microwave energy) would ultimately damage the magnetron. The intensity of standing waves can cause arcing through reflection. Sustained arcing will affect and damage the magnetron. Accordingly, the microwave susceptor should also serve as an energy sink for excess microwave energy. Use of a Ferrite Isolator, preferably water cooled, would help prevent damage to the magnetron by microwave power reflected back into the waveguide. The ferrite isolator absorbs reflected power. Microwave ovens have a built-in waveguide, but adapting a ferrite isolator to the confines of a microwave oven as utilized for purposes of the apparatus described herein would essentially require its rebuilding. As such, it would be more practicable to construct a waveguide and cavity resonator assembly, whereby the ferrite isolator could be inserted in the waveguide between the microwave generating device (typically a magnetron, but a klystron is also a microwave generating device) and the cavity resonator.

2.0 Water Pretreatment Phase (Optional)—This Phase is optional. It involves three components and/or features; Microwave Susceptor, a Helical or Looped Tubular Shape of Copper, and Water. The Microwave Susceptor transfers and/or imparts radiant/heat energy to the Helical or Looped Tubular Shape of Copper (See 2.2 Following) and alters the copper's physical characteristics (such as, but not necessarily limited to its temperature). Water supplied to the interior of the Helical or Looped Tubular Shape of Copper upon exposure or contact with the altered copper, will in turn, have its physical characteristics altered (such as, but not necessarily limited to the water's temperature). It is the use of the Helical or Looped Tubular Shape of Copper to alter the water's physical characteristics (such as, but not necessarily limited to the water's temperature) that defines the optional nature of this phase. Though the Microwave Susceptor and Water are necessary components and/or features for the apparatus, the use of Helical or Looped Tubular Shape of Copper only serves to precondition the water prior to the Reactive Stage (See 3.0 Following). Moreover, though copper is cited, materials with thermal conductivity higher than iron may be used in lieu of copper. Additionally, the sustained exposure of copper or said other materials with thermal conductivity higher than iron to the mixture of Argon and Sulfur mixture utilized as Microwave Susceptor (See 1.2 Prior) may require a application of a protective sheathing composed of a material resistive to the effects of the Argon and Sulfur mixture to the copper or said other materials with thermal conductivity higher than iron; provided said material used as a protective sheathing is counterbalanced with the thermal conductivity required in order to alter the water's physical characteristics (such as, but not necessarily limited to the water's temperature). Following is a narrative for each of the components and/or features; detailing their operative function, interface with each other, effect(s) and/or result(s), and other applicable considerations.

2.1 Microwave Susceptor—A material capable of absorbing and/or assimilating microwave energy and converting it to radiant/heat energy. (See 1.2 Prior) For purposes of this simplified apparatus a mixture utilizing Argon and Sulfur as microwave susceptor is used.

2.1.1 Microwave Susceptor transfers radiant/heat heat to the Helical or Looped Tubular Shape of Copper and alters the copper's physical characteristics (such as, but not necessarily limited to its temperature).

2.2 Helical or Looped Tubular Shape of Copper—Water supplied to the interior of the Helical or Looped Tubular Shape of Copper upon exposure or contact with the altered copper, will in turn, have its physical characteristics altered (such as, but not necessarily limited to the water's temperature). A Helical or Looped Tubular Shape is recommended to increase exposure surface of the copper to water, the time of the exposure, and to allow for expansion and contraction of the copper.

2.2.1 The copper due to its thermal conductivity pretreats the water and facilitates the water's subsequent reaction with iron to produce and/or derive hydrogen.

2.2.1.1 The Helical or Looped Tubular Shape of Copper connects to the Helical or Looped Tubular Shape of Iron and conduits the pretreated water to the interior of the Helical or Looped Tubular Shape of Iron. (See 3.3 Following) A flexible connection is recommended between the Helical or Looped Tubular Shape of Copper and the Helical or Looped Tubular Shape of Iron to allow for expansion and contraction differences between dissimilar materials. Ideally, the flexible connection material(s) will be unaffected or sufficiently unaffected by microwaves so as to avoid their failure when subjected to microwave energy in the event the apparatus configuration subjects them to microwave energy. Also, the use of screening to act as a Faraday Cage and protect the flexible connection, that is, to channel Microwave energy away from it, is an additional available alternative to limit or eliminate its subjection to microwave energy.

2.3 Water—Supplied via a connecting inlet into the Helical or Looped Tubular Shape of Copper via openings or ports through the wall of the cavity resonator (See 1.1.2 Prior) and the wall of the vessel containing, sealing in, and enclosing the Argon and Sulfur mixture serving as microwave susceptor. Methods to protect the water inlets and associated openings or ports from failure due to microwave energy, and to eliminate or substantially limit microwave leakage through the openings or ports are previously described (See 1.1.2.1.1 and 1.1.2.1.2 Prior).

2.3.1 The Water would flow down via gravity effect into the Helical or Looped Tubular Shape of Copper. (See 1.1.2.1 Prior)

2.3.1.1 The Water must exert sufficient pressure to enter into and circuit through the Helical or Looped Tubular Shape of Copper and into the Helical or Looped Tubular Shape of Iron connecting to it. (See 3.2 Following).

2.3.1.1.1 Use of a reservoir vessel of Water anterior the Water supply inlet(s) connecting into the Helical or Looped Tubular Shape of Copper would assist in raising its pressure and steady its flow, facilitating its entry and circuiting through the Helical or Looped Tubular Shape of Copper and into the Helical or Looped Tubular Shape of Iron connecting to it.

3.0 Reactive Phase—This Phase involves three components and/or features; Microwave Susceptor, a Helical or Looped Tubular Shape of Iron, and Water. The Microwave Susceptor transfers and/or imparts radiant/heat energy to the Helical or Looped Tubular Shape of Iron and alters the iron's physical characteristics (such as, but not necessarily limited to its temperature). Water supplied to the interior of the Helical or Looped Tubular Shape of Iron upon exposure or contact with the altered iron, will in turn, have its physical characteristics altered (such as, but not necessarily limited to the water's temperature) and result in a reaction of the water and the iron to produce and/or derive Hydrogen. The sustained exposure of iron to the mixture of Argon and Sulfur mixture utilized as Microwave Susceptor (See 1.2 Prior) may require the application of a protective sheathing composed of a material resistive to the effects of the Argon and Sulfur mixture to the iron; provided said material used as a protective sheathing is counterbalanced with the thermal conductivity required in order to alter the water's physical characteristics (such as, but not necessarily limited to the water's temperature). Following is a narrative for each of the components and/or features; detailing their operative function, interface with each other, effect(s) and/or result(s), and other applicable considerations.

3.1 Microwave Susceptor—A material capable of absorbing and/or assimilating microwave energy and converting it to radiant/heat energy. (See 1.2 Prior) For purposes of this simplified apparatus a mixture utilizing Argon and Sulfur as microwave susceptor is used. Microwave Susceptor transfers radiant/heat heat to the Helical or Looped Tubular Shape of Iron and alters the iron's physical characteristics (such as, but not necessarily limited to its temperature).

3.2 Helical or Looped Tubular Shape of Iron—Water supplied to the interior of the Helical or Looped Tubular Shape of Iron upon exposure or contact with the altered iron, will in turn, have its physical characteristics altered (such as, but not necessarily limited to the water's temperature). A Helical or Looped Tubular Shape is recommended to increase exposure surface of the iron to water or pretreated water, the time of the exposure, and to allow for expansion and contraction of the iron.

3.2.1 The interior of the Helical or Looped Tubular Shape of Iron will serve as the reaction site of the water and iron.

3.2.2 The Helical or Looped Tubular Shape of Iron will also conduit the Hydrogen comingled and/or immixed with other substances, products and/or by-products resulting from the reaction, and/or remaining after the reaction.

3.2.2.1 The Helical or Looped Tubular Shape of Iron will connect to a Helical or Looped Tubular Shape of Copper (See 4.2 Following) immersed in a Condensing Vessel. The connecting outlet from the Helical or Looped Tubular Shape of Iron into the Helical or Looped Tubular Shape of Copper immersed in the Condensing Vessel will traverse the wall of the cavity resonator (See 1.1.2 Prior) and the wall of the vessel containing, sealing in, and enclosing the Argon and Sulfur mixture serving as microwave susceptor via openings or ports. Methods to protect the outlet and associated openings or ports from failure due to microwave energy, and to eliminate or substantially limit microwave leakage through the openings or ports are previously described (See 1.1.2.1.1 and 1.1.2.1.2 Prior).

3.3 Water or Pretreated Water—Water would be supplied via a connecting inlet into the Helical or Looped Tubular Shape of Iron through openings or ports in the walls of the cavity resonator (See 1.1.2 Prior); or, if the optional Water Pretreatment Phase is implemented, Pretreated Water will be conducted from the Helical or Looped Tubular Shape of Copper (See 2.2.1.1 Prior) connecting to the Helical or Looped Tubular Shape of Iron. Methods to protect the water inlets and associated openings or ports from failure due to microwave energy, and to eliminate or substantially limit microwave leakage through the openings or ports are previously described (See 1.1.2.1.1 and 1.1.2.1.2 Prior).

3.3.1 The Water would flow down via gravity effect Into the Helical or Looped Tubular Shape of Iron.
   3.3.1.1 The Water must exert sufficient pressure to enter into and circuit through the Helical or Looped Tubular Shape of Iron; or, if the optional Water Pretreatment Phase is implemented, the Pretreated Water must exert sufficient pressure to enter into and circuit through the Helical or Looped Tubular Shape of Copper and into the Helical or Looped Tubular Shape of Iron connecting to it. (See 2.3.1.1 Prior)
      3.3.1.1.1 Use of a reservoir vessel of Water anterior the Water supply inlet(s) connecting into the Helical or Looped Tubular Shape of Iron; or, if the optional Water Pretreatment Phase is implemented, use of a reservoir vessel of Water anterior the Water supply inlet(s) connecting into the Helical or Looped Tubular Shape of Copper (See 2.3.1.1.1 Prior), would assist in raising its pressure and steady its flow, facilitating its entry and circuiting through the Helical or Looped Tubular Shape of Iron; or, if the optional Water Pretreatment Phase is implemented, facilitating its entry and circuiting through the Helical or Looped Tubular Shape of Copper and into the Helical or Looped Tubular Shape of Iron connecting to it.

4.0 Condensation Phase—This Phase occurs outside the confines of the cavity resonator (See 1.1 Prior), and involves two components and/or features; Coolant Vessel and a Helical or Looped Tubular Shape of Copper. The Coolant Vessel contains a coolant. The Helical or Looped Tubular Shape of Copper is immersed in the coolant. The Hydrogen comingled and/or immixed with other substances, products and/or by-products resulting from the reaction, and/or remaining after the reaction will be fed into and circuit through the Helical or Looped Tubular Shape of Copper immersed in the coolant (See 3.2.2.1 Prior). Heat exchange occurs through the wall of the Helical or Looped Tubular Shape of Copper; whereby energy is transferred between the Hydrogen comingled and/or immixed with other substances, products and/or by-products resulting from the reaction, and/or remaining after the reaction, and the coolant; resulting in a separation process of the Hydrogen, and other substances, products and/or by-products resulting from the reaction, and/or remaining after the reaction that are comingled and/or immixed with the Hydrogen. The condensation process via heat exchange with water as coolant as described is a simplified assembly. Alternative means for achieving the separation process of the Hydrogen, and other substances, products and/or by-products resulting from the reaction, and/or remaining after the reaction that are comingled and/or immixed with the Hydrogen are available; accordingly, the means and/or methods of achieving the separation process are variable, without limit, and combinable.
   4.1 Coolant Vessel—The Coolant Vessel would contain the coolant fluid; the Helical or Looped Tubular Shape of Copper is immersed in the coolant fluid (See 4.2 Following). There are a variety of substances with properties that could, or would, serve as a coolant. For purposes of this simplified apparatus, water may be used. Considerations regarding the configuration of the Coolant Vessel would include:
      4.1.1 Openings or ports in the wall(s) of the Coolant Vessel to allow an inlet for conducting Hydrogen comingled and/or immixed with other substances, products and/or by-products resulting from the reaction, and/or remaining after the reaction from the Helical or Looped Tubular Shape of Iron to the Helical or Looped Tubular Shape of Copper; and openings or ports in the wall(s) of the Coolant Vessel to allow an outlet for conducting Hydrogen, and other substances, products and/or by-products resulting from the reaction, and/or remaining after the reaction that are comingled and/or immixed with the Hydrogen subsequent the separation process.
      4.1.1.1 The elevation of the Coolant Vessel and the locations of the openings or ports in the wall(s) of the Coolant Vessel should be coordinated to take advantage of the effect of gravity:
         4.1.1.1.1 The outlet for conducting Hydrogen comingled and/or immixed with other substances, products and/or by-products resulting from the reaction, and/or remaining after the reaction from the Helical or Looped Tubular Shape of Iron, should be at a higher point relative the inlet for conducting Hydrogen comingled and/or immixed with other substances, products and/or by-products resulting from the reaction, and/or remaining after the reaction to the Helical or Looped Tubular Shape of Copper immersed in the coolant fluid (See 3.2.2.1 Prior).
         4.1.1.1.2 The outlet for conducting from the Helical or Looped Tubular Shape of Copper immersed in the coolant fluid, after the separation process of the Hydrogen, and other substances, products and/or by-products resulting from the reaction, and/or remaining after the reaction that are comingled and/or immixed with the Hydrogen should be at a lower point relative the inlet for conducting Hydrogen comingled and/or immixed with other substances, products and/or by-products resulting from the reaction, and/or remaining after the reaction from the Helical or Looped Tubular Shape of Iron conducting Hydrogen comingled and/or immixed with other substances, products and/or by-products resulting from the reaction, and/or remaining after the reaction to the Helical or Looped Tubular Shape of Copper immersed in the coolant fluid.
      4.1.2 The Coolant Vessel should be open at the top to the atmosphere to allow evaporative cooling of the water as coolant; the more energetic water molecules in the coolant vessel escape through the open top taking away heat cooling the balance of the water in the Coolant Vessel. The reference to "evaporative cooling" wherein water is used as coolant, resulting in a separation process via condensation of the Hydrogen, and other substances, products and/or by-products resulting from the reaction, and/or remaining after the reaction that are comingled and/or immixed with the Hydrogen; is for a simplified assembly that will allow the separation process. Alternative means not relying fully and/or partially on condensation using water as coolant are feasible; accordingly, the means and/or methods of separation of the Hydrogen, and other substances, products and/or by-products resulting from the reaction, and/or remaining after the reaction that are comingled and/or immixed with the Hydrogen, are variable, without limit, and combinable.
         4.1.2.1 Due to the evaporative cooling process, water loss will occur and must be compensated; a water make-up system is necessary. It is recommended a simple floater system be used that detects the drop in water level inside the Coolant Vessel and triggers a valve or valves to open and provide feed water from a reservoir vessel, a feed line, or a water replenishment method combining both; that is, a reservoir vessel and a feed line.

4.1.2.1.1 The dimension and size of the coolant vessel; that is, its proportions, must be balanced between the requirements of the evaporative cooling and floater system assembly.

4.1.2.1.1.1 For convenience when emptying, it is recommended a drain valve be provided at or near the bottom of the Coolant Vessel.

4.2 Helical or Looped Tubular Shape of Copper—The Helical or Looped Tubular Shape of Copper is immersed in the water as coolant within the Coolant Vessel. (See 4.1 Prior) Hydrogen comingled and/or immixed with other substances, products and/or by-products resulting from the reaction, and/or remaining after the reaction will be conducted from the Helical or Looped Tubular Shape of Iron to the Helical or Looped Tubular Shape of Copper (See 3.2.2.1 and 4.1.1.1.1 Prior). A Helical or Looped Tubular Shape is recommended to increase exposure surface of the copper to Hydrogen comingled and/or immixed with other substances, products and/or by-products resulting from the reaction, and/or remaining after the reaction, the time of the exposure, and to allow for expansion and contraction of the copper. Also, a flexible connection from the Helical or Looped Tubular Shape of Iron to the Helical or Looped Tubular Shape of Copper is recommended to allow for expansion and contraction differences between dissimilar materials.

4.2.1 The copper due to its thermal conductivity initiates a separation process of the Hydrogen, and other substances, products and/or by-products resulting from the reaction, and/or remaining after the reaction that are comingled and/or immixed with the Hydrogen, via the removal of energy.

4.2.1.1 Heat exchange occurs through the wall of the Helical or Looped Tubular Shape of Copper; whereby energy is transferred between the water as coolant, and the Hydrogen and other comingled and/or immixed substances, products and/or by-products, resulting from the reaction, and/or remaining after the reaction.

4.2.1.2 The Helical or Looped Tubular Shape of Copper connects to a Sealed Vessel (See 5.1 Following) wherein the Hydrogen, and other substances, products and/or by-products resulting from the reaction, and/or remaining after the reaction that are comingled and/or immixed with the Hydrogen having undergone separation are collected.

5.0 Hydrogen Isolation Phase—This Phase involves two components and/or features; a Sealed Vessel and a Siphon Line. The Hydrogen, and other substances, products and/or by-products resulting from the reaction, and/or remaining after the reaction that are comingled and/or immixed with the Hydrogen having undergone separation are collected in the Sealed Vessel. The Sealed Vessel is connected to the Helical or Looped Tubular Shape of Copper immersed in the Coolant Vessel (See 4.2 Prior). During collection, that is, as the separated Hydrogen, and other substances, products and/or by-products resulting from the reaction, and/or remaining after the reaction that are comingled and/or immixed with the Hydrogen are drained into the Sealed Vessel from the Helical or Looped Tubular Shape of Copper immersed in the Coolant Vessel; the lighter substances being gaseous and/or vaporous rise to the top of the Sealed Vessel. A Siphon Line from the top of the Sealed Vessel would conduit off the gases and vapors. Among the gases would be Hydrogen; the lightest of the gases. The isolation process as described is a simplified assembly. Alternative means for achieving the isolation of Hydrogen, and other substances, products and/or by-products resulting from the reaction, and/or remaining after the reaction that are comingled and/or immixed with the Hydrogen are available; accordingly, the means and/or methods of achieving the isolation process are variable, without limit, and combinable. The reference to "collected in the Sealed Vessel" wherein the Hydrogen, and other substances, products and/or by-products resulting from the reaction, and/or remaining after the reaction that are comingled and/or immixed with the Hydrogen having undergone separation are retained; is for a simplified assembly that will allow the separation process. Alternative means are feasible for isolation and collection; accordingly, the means and/or methods of isolating and collecting the Hydrogen, and other substances, products and/or by-products resulting from the reaction, and/or remaining after the reaction that are comingled and/or immixed with the Hydrogen, are variable, without limit, and combinable 5.1 Sealed Vessel—The Sealed Vessel collects the separated Hydrogen, and other substances, products and/or by-products resulting from the reaction, and/or remaining after the reaction that are comingled and/or immixed with the Hydrogen. Considerations regarding the configuration of the Sealed Vessel would include:

5.1.1 The elevation of the Sealed Vessel and the locations of the openings or ports at or near the top of the Sealed Vessel should be coordinated to take advantage of the effect of gravity; openings or ports at or near the top of the Sealed Vessel to allow:

5.1.1.1 The inlet for conducting Hydrogen comingled and/or immixed with other substances, products and/or by-products resulting from the reaction, and/or remaining after the reaction from the Helical or Looped Tubular Shape of Copper immersed in the Coolant Vessel to the Sealed Vessel, should be at a lower point relative the outlet for conducting Hydrogen comingled and/or immixed with other substances, products and/or by-products resulting from the reaction, and/or remaining after the reaction from the Helical or Looped Tubular Shape of Copper immersed in the Coolant Vessel to the Sealed Vessel. (See 4.1.1.1.2 Prior)

5.1.1.2 An outlet for a Siphon Line to conduit off the gases and vapors. (See 5.2 Following)

5.1.2 For convenience, it is recommended a drain valve be provided near bottom of the Coolant Vessel for non-gaseous and/or non-vaporous substances, products and/or by-products resulting from the reaction.

5.2 Siphon Line—Conduits off the gases and vapors; including Hydrogen, the lightest gas. Considerations regarding the configuration of the Siphon Line would include:

5.2.1 Connects to the near top of the Sealed Vessel.

5.2.1.1 Direction of line leads upwards and of sufficient length to a allow Other Substances in vapor remaining immixed with the Hydrogen to condense onto interior of Piping and flow back into Sealed Vessel; or remain unmixed with the Hydrogen within the line.

5.2.1.1.1 Line would tie in with a hydrogen collection system and/or method.

6.0 Hydrogen Collection Phase—Components and/or features are not specified for this stage as a variety of systems and/or methods exist for collecting gas. Hydrogen, being the lightest gas, can be accumulated via upward delivery into a chamber; or the upward delivery may be coupled with an over water or pneumatic trough method wherein water is displaced within the chamber as gas accumulates (very workable as Hydrogen is sparingly soluble in water). Regardless, no final specification for gas collection is proposed; for purposes of this simplified apparatus upward delivery into a chamber coupled with an over water or pneumatic trough method would serve. It is noted however, that alternate means for Hydrogen Collection are feasible; accordingly, the means and/or methods of collecting the Hydrogen are variable, without limit, and combinable.

Apparatus C

Utilizing an Argon and Sulfur Mixture as the Microwave Susceptor, Contained and Enclosed within Cavity Resonator Serving Dually as the Vessel Containing and Enclosing the Argon and Sulfur Mixture Utilized as Microwave Susceptor 1.0 Irradiation Phase—This Phase involves four components and/or features; Microwave Cavity Resonator serving dually as the Vessel containing and enclosing the Microwave Susceptor; the Microwave Susceptor; Microwave generating device or devices; and Waveguide or Waveguides to direct and/or channel Microwaves generated by Microwave generating device or devices. A Microwave generating device or devices irradiates the Microwave Susceptor within the Cavity Resonator serving dually as the Vessel containing and enclosing the Microwave Susceptor with microwave energy; in turn the Microwave Susceptor converts the microwave energy to radiant/heat energy. Following is a narrative for each of the components and/or features; detailing their operative function, interface with each other, effect(s) and/or result(s), and other applicable considerations.

1.1 Microwave Cavity Resonator serving dually as the Vessel containing and enclosing the Microwave Susceptor—The walls of the Cavity Resonator would be of a material reflective of Microwaves and its interior dimensions would be proportioned so as to create a resonant effect of the Microwaves. Additionally, the Cavity Resonator would also serve dually as the Vessel containing and enclosing the Argon and Sulfur mixture utilized as Microwave Susceptor (See 1.2 Following). Microwaves generated by a Microwave generating device or devices (See 1.3 Following) would be directed and/or channeled into the Cavity Resonator serving dually as the Vessel containing and enclosing the Microwave Susceptor. Directing and or channeling the Microwaves from the Microwave generating device or devices into the Cavity Resonator serving dually as the Vessel containing and enclosing the Microwave Susceptor would require use of a waveguide or waveguides (See 1.1.1.4 and 1.4.1 Following).

1.1.1 The Cavity Resonator serving dually as the Vessel containing and enclosing the Microwave Susceptor must maintain its physical and structural integrity while withstanding heat buildup as the Microwave Susceptor converts the microwave energy to radiant/heat energy. The listed performance considerations and design parameters of the Cavity Resonator serving dually as the Vessel containing and enclosing the Microwave Susceptor have to be counterbalanced with the other performance considerations and design parameters so as to not nullify them individually and/or collectively.

1.1.1.1 Sizing and Configuration—The sizing and configuration parameters of the Cavity Resonator serving dually as the Vessel containing and enclosing the Microwave Susceptor are as follows:

1.1.1.1.1 Dimensions of the interior of the Cavity Resonator serving dually as the Vessel containing and enclosing the Microwave Susceptor must conform to maintain a resonant effect. (See 1.1.1.2 Following)

1.1.1.1.2 The size of the Cavity Resonator serving dually as the Vessel containing and enclosing the Microwave Susceptor also encloses the Helical or Looped Tubular Shape Copper (See 2.2 Following) and/or the Helical or Looped Tubular Shape of Iron. (See 3.3 Following) The dimensions and sizing of the Helical or Looped Tubular Shape Copper and/or the Helical or Looped Tubular Shape of Iron are not specified as they are a function of the amount hydrogen to be produced, derived and/or required for end use. Accordingly, the size of the Cavity Resonator serving dually as the Vessel containing and enclosing the Microwave Susceptor is scalable to, and in tandem with, the dimensions and sizing of the Helical or Looped Tubular Shape Copper and/or the Helical or Looped Tubular Shape of Iron.

1.1.1.2 Maintenance of Resonant Effect—the interior of the Cavity Resonator serving dually as the Vessel containing and enclosing the Microwave Susceptor must be of a material that is reflective of microwaves and internally dimensioned so as to maintain a resonant effect of the microwaves.

1.1.1.3 Heat Resistance—the Cavity Resonator serving dually as the Vessel containing and enclosing the Microwave Susceptor must be composed of a material with high heat resistance due to the heat buildup as the Microwave Susceptor converts the microwave energy to radiant/heat energy; that is, it must maintain its physical and structural integrity. Additionally, the materials resistance to temperature may be further aided via methods listed below. However, means and/or methods of aiding the materials resistance to temperature are variable, without limit, and combinable.

1.1.1.3.1 Modifying or modulating the concentrations of Argon and Sulfur used as Microwave Susceptor (See 1.2 Following).

1.1.1.3.1.1 The Argon and Sulfur concentrations within the vessel may be adjusted to control and affect the temperature generated within the Cavity Resonator serving dually as the Vessel containing and enclosing the Microwave Susceptor; that is, Argon and Sulfur. The Argon and Sulfur concentrations within the vessel may be homogeneously or selectively distributed. Maintaining a relatively uniform distribution of the Argon and Sulfur mixture within the vessel may require a mechanical means of agitation (for example, a vibratory method).

1.1.1.3.2 Cycling of the Microwave Generating Device(s) to control the extent of microwave irradiation of the Argon and Sulfur used as Microwave Susceptor. (See 1.3 Following).

1.1.1.3.3 Conductive cooling via a liquid, gaseous and/or other mediums in differing states of matter to draw heat from the Cavity Resonator serving dually as the Vessel containing and enclosing the Microwave Susceptor.

1.1.1.3.3.1 Conductive cooling of the Cavity Resonator serving dually as the Vessel containing and enclosing the Microwave Susceptor entails supplying and/or circulation of a coolant whether liquid, gaseous and/or other mediums in differing states of matter; said liquid, gaseous and/or other mediums in differing states of matter are adjustable, alterable and/or discretionary; accordingly, configurations, means and/or methods of supply and circulation of liquid, gaseous and/or other mediums in differing states of matter are variable, without limit, and combinable.

1.1.1.4 Retention of Radiant/Heat Energy—the Cavity Resonator serving dually as the Vessel containing and enclosing the Microwave Susceptor must be of a material capable of retaining heat within its confines generated as the Microwave Susceptor converts the microwave energy to radiant/heat energy. Additionally, the materials capability to retain heat within its confines may be further aided by:

1.1.1.4.1.1 Insulation so as to minimize dissipation of the radiant/heat energy generated within its confines as the Microwave Susceptor converts the microwave energy to radiant/heat energy. Insulative mediums, configurations and/or methods may include solid, liquid or gaseous mediums or a combination thereof, accordingly, means and/or methods for minimizing dissipation of radiant/heat energy generated within the confines the Cavity Resonator serving dually as the Vessel containing and enclosing the Microwave Susceptor via insulation are variable, without limit, and combinable.

1.1.1.5 Sealed Opening or Openings, or Sealed Port or Ports built into the walls of the Cavity Resonator aligned with, or to, the Waveguide or Waveguides (See 1.4 Following) directing and/or channeling the Microwaves from the Microwave generating device or devices (See 1.3 Following)—the Cavity Resonator serving dually as the Vessel containing and enclosing the Microwave Susceptor must remain sealed to retain within its confines the mixture utilizing Argon and Sulfur as microwave susceptor (See 1.2 Following); accordingly, said sealed opening or openings, or sealed port or ports in the walls of the Cavity Resonator must also be sealed. Further, said sealed opening or openings, or sealed port or ports built into the walls of the Cavity Resonator are to be of a material Transparent and/or Permeable by Microwaves so as to allow the Argon and Sulfur mixture contained within the Cavity Resonator be subjected to microwaves. Moreover, said sealed opening or openings, or sealed port or ports built into the walls of the Cavity Resonator must also maintain their physical and structural integrity while withstanding heat buildup as the Microwave Susceptor converts the microwave energy to radiant/heat energy. Moreover, the performance considerations and design parameters of said sealed opening or openings, or sealed port or ports built into the walls of the Cavity Resonator must also be counterbalanced with the previously listed performance considerations and design parameters of the Cavity Resonator serving dually as the Vessel containing and enclosing the Microwave Susceptor so as to not nullify them individually and/or collectively (See 1.1.1.1, 1.1.1.2, 1.1.1.3 Prior). Additionally, said sealed opening or openings, or sealed port or ports built into the walls of the Cavity Resonator must also to a practicable degree support or assist with maintaining the previously listed performance considerations and design parameters of the Cavity Resonator (See 1.1.1.1, 1.1.1.2, 1.1.1.3 Prior). Concomitantly; the previously listed performance considerations and design parameters of the Cavity Resonator (See 1.1.1.1, 1.1.1.2, 1.1.1.3 Prior) embody performance considerations and design parameters of said sealed opening or openings, or sealed port or ports in the walls of the Cavity Resonator; therefore, with a practical similitude to the Cavity Resonator; means and/or methods of aiding said sealed opening or openings, or sealed port or ports in the walls of the Cavity Resonator to embody the required performance considerations and design parameters are variable, without limit, and combinable.

1.1.1.6 Openings or ports in the wall(s) of the Cavity Resonator serving dually as the Vessel containing and enclosing the Microwave Susceptor for Water Supply inlet and an Outlet for Hydrogen comingled and/or immixed with other substances, products and/or by-products resulting from the reaction, and/or remaining after the reaction—the Cavity Resonator serving dually as the Vessel containing and enclosing the Microwave Susceptor contains within it a Helical or Looped Tubular Shape of Copper (See 2.2 Following) and/or a Helical or Looped Tubular Shape of Iron (See 3.2 Following). Water supplied to the interior of the Helical or Looped Tubular Shape of Copper and/or the Helical or Looped Tubular Shape of Iron upon exposure or contact with the altered copper, will in turn, have its physical characteristics altered (such as, but not necessarily limited to the water's temperature). The term "reaction", whenever used herein, with relation to this apparatus, whether in singular, plural or possessive form, refers to a fast reaction of the water and the element iron to produce and/or derive hydrogen. To explain, the water continues to heat beyond its saturation temperature to a temperature that permits a fast reaction with the element iron. Among the products of the reaction is hydrogen.

1.1.1.6.1 The locations of the openings or ports in the wall(s) of the Cavity Resonator should be coordinated to take advantage of the effect of gravity; that is, the water supply inlet should be at a high point relative the Helical or Looped Tubular Shape of Copper (See 2.2 Following) or the Helical or Looped Tubular Shape of Iron (See 3.3 Following), and the outlet for Hydrogen comingled and/or immixed with other substances, products and/or by-products resulting from the reaction, and/or remaining after the resulting from the reaction resulting from the reaction should be at a low point relative the Helical or Looped Tubular Shape of Iron. The reference to "effect of gravity" or "gravity effect" whenever used herein, with relation to this apparatus is meant for a simplified assembly that will allow channeling and/or directing of the Water and/or the Hydrogen comingled and/or immixed with other substances, products and/or by-products resulting from the reaction, and/or remaining after the reaction. As such, the term "effect of gravity" implies a force, head, pressure, weight, and/or load that will channel and/or direct the Water and the Hydrogen comingled and/or immixed with other substances, products and/or by-products resulting from the reaction, and/or remaining after the reaction. Alternative means not relying fully and/or partially on gravity effect are feasible; accordingly, the means and/or methods of channeling and/or directing water are variable, without limit, and combinable.

1.2 Microwave Susceptor—A material or combination of materials capable of absorbing and/or assimilating microwave energy and converting it to radiant/heat energy. For purposes of this simplified apparatus a mixture utilizing Argon and Sulfur as microwave susceptor is used, provided it is contained, sealed and enclosed in a Cavity Resonator (See 1.1 Prior). The Cavity Resonator should also be configured to enclose within it the Helical or Looped Tubular Shape Copper (See 2.2 Following) and/or the Helical or Looped Tubular Shape of Iron (See 3.3 Following) so as to expose them to, and be enveloped by the mixture of Argon and Sulfur contained, sealed and enclosed within the Cavity Resonator. The use of Argon and Sulfur as a microwave susceptor is observable in Sulfur Lamp technology. To explain, a Sulfur Lamp's mode of operation is based on enclosing a mixture of Argon and Sulfur in a quartz bulb and subjecting it to microwave energy. In fact, the magnetron utilized to generate the microwaves is the same as those found in a typical microwave oven. The microwave energy excites the Argon gas; in turn, the Argon gas heats the Sulfur to a high temperature and a glowing plasma results. The high temperature considerations, requires the quartz bulb be spun rapidly and air be circulated to cool the bulb and avoid its meltdown. The temperature characteristics are extreme; and are the applicable property for purposes of the apparatus configuration illustrating operating principles of the process, method & device of this invention. Within the bulb (typically 1¼ inches in diameter), a temperature of 727 Celsius has been measured at the outside of the plasma, and estimated to be 3726 Celsius at its center. The capability to assimilate microwave energy and convert it to radiant/heat energy demonstrated in the mode of operation of the Sulfur Lamp serve for purposes of the apparatus described herein. There are other notable characteristics related to the mode of operation of the Sulfur Lamp. The design life of the bulb is about 60,000 hours; signifying the Argon and Sulfur mixture as used would outlast a magnetron with a design life of 10,000 to 15,000 hours. The following expands on a qualitative basis on the performance considerations and design parameters related to the use of Microwave Susceptors; and efficiency issues associated with microwave energy conversion by Microwave Susceptors to radiant/heat energy.

1.2.1 The conversion by the Microwave Susceptor of microwave energy to radiant/heat energy; and its ability to transfer radiant/heat energy to the Helical or Looped Tubular Shape of Copper (See 2.0 Following) and/or the Helical or Looped Tubular Shape of Iron (See 3.0 Following) are not completely efficient.

1.2.1.1 Unabsorbed microwave energy may cause the microwave generating device or devices (See 1.3 Following) to overheat. No load or under load operation of the microwave generating device -or devices (that is, excessive unabsorbed microwave energy) would ultimately damage the microwave generating device or devices. The intensity of standing waves can cause arcing through reflection. Sustained arcing will affect and damage the microwave generating device or devices. Accordingly, the microwave susceptor should also serve as an energy sink for excess microwave energy. Use of a Ferrite Isolator, preferably water cooled, would help prevent damage to the microwave generating device or devices by microwave power reflected back into the waveguide or waveguides (See 1.4 Following). The ferrite isolator absorbs reflected power.

1.3 Microwave Generating Device or Devices—Any device generating microwave energy (typically a magnetron or magnetrons, but klystrons are also microwave generating devices) for absorption by the Microwave Susceptor (See 1.2 Prior); the Microwave Susceptor subsequently transfers radiant/heat energy to the Helical or Looped Tubular Shape of Copper (See 2.0 Following) and/or the Helical or Looped Tubular Shape of Iron (See 3.0 Following).

1.4 Waveguide or Waveguides to direct and/or channel Microwaves generated by Microwave generating device or devices—Directing and/or channeling the Microwaves from the Microwave generating device or devices (See 1.3 Prior) into the Cavity Resonator serving dually as the Vessel containing and enclosing the Microwave Susceptor (See 1.2 Prior) would require use of a Waveguide or Waveguides. The following expands on a qualitative basis on the performance considerations and design parameters related to the use of Waveguide or Waveguides to direct and/or channel microwave energy into the Cavity Resonator serving dually as the Vessel containing and enclosing the Microwave Susceptor.

1.4.1 Alignment of Waveguide or Waveguides to Sealed Opening or Openings, or Sealed Port or Ports built into the walls of the Cavity Resonator—The Microwaves generated by the Microwave generating device or devices enter the Cavity Resonator through said Sealed Opening or Openings, or Sealed Port or Ports built into the walls of the Cavity Resonator. An important and primary property of said Sealed Opening or Openings, or Sealed Port or Ports built into the walls of the Cavity Resonator is its Transparency and/or Permeability by Microwaves so as to allow the Argon and Sulfur mixture contained within the Cavity Resonator to be subjected to microwaves.

1.4.1.1 Maintaining a relatively uniform distribution of the Argon and Sulfur mixture within the vessel may require a mechanical means of agitation; for example, a vibratory method (See 1.1.1.3.1.1 Prior). This implies the Waveguide or Waveguides have a flexible connection. The following expands on a qualitative basis on the performance considerations and design parameters related to said flexible connection:

- 1.4.1.1.1 The dimensions of the Sealed Port or Ports built into the walls of the Cavity Resonator need be sufficiently larger than the cross sectional dimension of the Waveguide or Waveguides to allow for alignment offset due to the agitation or vibration.
- 1.4.1.1.2 The flexible connection should be configured, sized and/or coordinated to eliminate or substantially limit microwave leakage. Means and/or methods to not allow and/or minimize microwave leakage at the flexible connection may include its material composition, physical configuration, and/or the use of screening acting as a Faraday Cage to maintain Microwave energy within the Waveguide or Waveguides. However, means and/or methods to not allow and/or minimize microwave leakage at the flexible connection are variable, without limit, and combinable.

1.4.2 Use of a Ferrite Isolator in the Waveguide or Waveguides—The incorporation of a Ferrite Isolator, preferably water cooled, in the Waveguide or Waveguides would help prevent damage to the microwave generating device or devices by microwave power reflected back into the Waveguide or Waveguides.

2.0 Water Pretreatment Phase (Optional)—This Phase is optional. It involves three components and/or features; Microwave Susceptor, a Helical or Looped Tubular Shape of Copper, and Water. The Microwave Susceptor transfers and/or imparts radiant/heat energy to the Helical or Looped Tubular Shape of Copper (See 2.2 Following) and alters the copper's physical characteristics (such as, but not necessarily limited to its temperature). Water supplied to the interior of the Helical or Looped Tubular Shape of Copper upon exposure or contact with the altered copper, will in turn, have its physical characteristics altered (such as, but not necessarily limited to the water's temperature). It is the use of the Helical or Looped Tubular Shape of Copper to alter the water's physical characteristics (such as, but not necessarily limited to the water's temperature) that defines the optional nature of this phase. Though the Microwave Susceptor and Water are necessary components and/or features for the apparatus, the use of Helical or Looped Tubular Shape of Copper only serves to precondition the water prior to the Reactive Stage (See 3.0 Following). Moreover, though copper is cited, materials with thermal conductivity higher than iron may be used in lieu of copper. Additionally, the sustained exposure of copper or said other materials with thermal conductivity higher than iron to the mixture of Argon and Sulfur mixture utilized as Microwave Susceptor (See 1.2 Prior) may require a application of a protective sheathing composed of a material resistive to the effects of the Argon and Sulfur mixture to the copper or said other materials with thermal conductivity higher than iron; provided said material used as a protective sheathing is counterbalanced with the thermal conductivity required in order to alter the water's physical characteristics (such as, but not necessarily limited to the water's temperature). Following is a narrative for each of the components and/or features; detailing their operative function, interface with each other, effect(s) and/or result(s), and other applicable considerations.

- 2.1 Microwave Susceptor—A material capable of absorbing and/or assimilating microwave energy and converting it to radiant/heat energy. (See 1.2 Prior) For purposes of this simplified apparatus a mixture utilizing Argon and Sulfur as microwave susceptor is used.
  - 2.1.1 Microwave Susceptor transfers radiant/heat heat to the Helical or Looped Tubular Shape of Copper and alters the copper's physical characteristics (such as, but not necessarily limited to its temperature).
- 2.2 Helical or Looped Tubular Shape of Copper—Water supplied to the interior of the Helical or Looped Tubular Shape of Copper upon exposure or contact with the altered copper, will in turn, have its physical characteristics altered (such as, but not necessarily limited to the water's temperature). A Helical or Looped Tubular Shape is recommended to increase exposure surface of the copper to water, the time of the exposure, and to allow for expansion and contraction of the copper.
  - 2.2.1 The copper due to its thermal conductivity pretreats the water and facilitates the water's subsequent reaction with iron to produce and/or derive hydrogen.
    - 2.2.1.1 The Helical or Looped Tubular Shape of Copper connects to the Helical or Looped Tubular Shape of Iron and conduits the pretreated water to the interior of the Helical or Looped Tubular Shape of Iron. (See 3.3 Following)
- 2.3 Water—Supplied via a connecting inlet into the Helical or Looped Tubular Shape of Copper via openings or ports through the wall of the Cavity Resonator serving dually as the Vessel containing and enclosing the Microwave Susceptor. (See 1.1.1.6 Prior)
  - 2.3.1 The Water would flow down via gravity effect into the Helical or Looped Tubular Shape of Copper. (See 1.1.1.6.1 Prior)
    - 2.3.1.1 The Water must exert sufficient pressure to enter into and circuit through the Helical or Looped Tubular Shape of Copper and into the Helical or Looped Tubular Shape of Iron connecting to it. (See 3.2 Following)
      - 2.3.1.1.1 Use of a reservoir vessel of Water anterior the Water supply inlet(s) connecting into the Helical or Looped Tubular Shape of Copper would assist in raising its pressure and steady its flow, facilitating its entry and circuiting through the Helical or Looped Tubular Shape of Copper and into the Helical or Looped Tubular Shape of Iron connecting to it.

3.0 Reactive Phase—This Phase involves three components and/or features; Microwave Susceptor, a Helical or Looped Tubular Shape of Iron, and Water. The Microwave Susceptor transfers and/or imparts radiant/heat energy to the Helical or Looped Tubular Shape of Iron and alters the iron's physical characteristics (such as, but not necessarily limited to its temperature). Water supplied to the interior of the Helical or Looped Tubular Shape of Iron upon exposure or contact with the altered iron, will in turn, have its physical characteristics altered (such as, but not necessarily limited to the water's temperature) and result in a reaction of the water and the iron to produce and/or derive Hydrogen. The sustained exposure of iron to the mixture of Argon and Sulfur mixture utilized as Microwave Susceptor (See 1.2 Prior) may require the application of a protective sheathing composed of a material resistive to the effects of the Argon and Sulfur mixture to the iron; provided said material used as a protective sheathing is counterbalanced with the thermal conductivity required in order to alter the water's physical characteristics (such as, but not necessarily limited to the water's temperature). Following is a narrative for each of the components and/or features; detailing their operative function, interface with each other, effect(s) and/or result(s), and other applicable considerations.

3.1 Microwave Susceptor—A material capable of absorbing and/or assimilating microwave energy and converting it to radiant/heat energy. (See 1.2 Prior) For purposes of this simplified apparatus a mixture utilizing Argon and Sulfur as microwave susceptor is used. Microwave Susceptor transfers radiant/heat heat to the Helical or Looped Tubular Shape of Iron and alters the iron's physical characteristics (such as, but not necessarily limited to its temperature).

3.2 Helical or Looped Tubular Shape of Iron—Water supplied to the interior of the Helical or Looped Tubular Shape of Iron upon exposure or contact with the altered iron, will in turn, have its physical characteristics altered (such as, but not necessarily limited to the water's temperature). A Helical or Looped Tubular Shape is recommended to increase exposure surface of the iron to water or pretreated water, the time of the exposure, and to allow for expansion and contraction of the iron.

3.2.1 The interior of the Helical or Looped Tubular Shape of Iron will serve as the reaction site of the water and iron.

3.2.2 The Helical or Looped Tubular Shape of Iron will also conduit the Hydrogen comingled and/or immixed with other substances, products and/or by-products resulting from the reaction, and/or remaining after the reaction.

3.2.2.1 The Helical or Looped Tubular Shape of Iron will connect to a Helical or Looped Tubular Shape of Copper (See 4.2 Following) immersed in a Condensing Vessel. The connecting outlet from the Helical or Looped Tubular Shape of Iron into the Helical or Looped Tubular Shape of Copper immersed in the Condensing Vessel will traverse the wall of the cavity resonator (See 1.1.2 Prior) and the wall of the vessel containing, sealing in, and enclosing the Argon and Sulfur mixture serving as microwave susceptor via openings or ports. Methods to protect the outlet and associated openings or ports from failure due to microwave energy, and to eliminate or substantially limit microwave leakage through the openings or ports are previously described (See 1.1.2.1.1 and 1.1.2.1.2 Prior).

3.3 Water or Pretreated Water—Water would be supplied via a connecting inlet into the Helical or Looped Tubular Shape of Iron through openings or ports in the walls of the cavity resonator (See 1.1.1.6 Prior); or, if the optional Water Pretreatment Phase is implemented, Pretreated Water will be conducted from the Helical or Looped Tubular Shape of Copper (See 2.2.1.1 Prior) connecting to the Helical or Looped Tubular Shape of Iron.

3.3.1 The Water would flow down via gravity effect Into the Helical or Looped Tubular Shape of Iron.

3.3.1.1 The Water must exert sufficient pressure to enter into and circuit through the Helical or Looped Tubular Shape of Iron; or, if the optional Water Pretreatment Phase is implemented, the Pretreated Water must exert sufficient pressure to enter into and circuit through the Helical or Looped Tubular Shape of Copper and into the Helical or Looped Tubular Shape of Iron connecting to it. (See 2.3.1.1 Prior)

3.3.1.1.1 Use of a reservoir vessel of Water anterior the Water supply inlet(s) connecting into the Helical or Looped Tubular Shape of Iron; or, if the optional Water Pretreatment Phase is implemented, use of a reservoir vessel of Water anterior the Water supply inlet(s) connecting into the Helical or Looped Tubular Shape of Copper (See 2.3.1.1.1 Prior) would assist in raising its pressure and steady its flow, facilitating its entry and circuiting through the Helical or Looped Tubular Shape of Iron; or, if the optional Water Pretreatment Phase is implemented, facilitating its entry and circuiting through the Helical or Looped Tubular Shape of Copper and into the Helical or Looped Tubular Shape of Iron connecting to it.

4.0 Condensation Phase—This Phase occurs outside the confines of the cavity resonator (See 1.1 Prior), and involves two components and/or features; Coolant Vessel and a Helical or Looped Tubular Shape of Copper. The Coolant Vessel contains a coolant. The Helical or Looped Tubular Shape of Copper is immersed in the coolant. The Hydrogen comingled and/or immixed with other substances, products and/or by-products resulting from the reaction, and/or remaining after the reaction will be fed into and circuit through the Helical or Looped Tubular Shape of Copper immersed in the coolant (See 3.2.2.1 Prior). Heat exchange occurs through the wall of the Helical or Looped Tubular Shape of Copper; whereby energy is transferred between the Hydrogen comingled and/or immixed with other substances, products and/or by-products resulting from the reaction, and/or remaining after the reaction, and the coolant; resulting in a separation process of the Hydrogen, and other substances, products and/or by-products resulting from the reaction, and/or remaining after the reaction that are comingled and/or immixed with the Hydrogen. The condensation process via heat exchange with water as coolant as described is a simplified assembly. Alternative means for achieving the separation process of the Hydrogen, and other substances, products and/or by-products resulting from the reaction, and/or remaining after the reaction that are comingled and/or immixed with the Hydrogen are available; accordingly, the means and/or methods of achieving the separation process are variable, without limit, and combinable.

4.1 Coolant Vessel—The Coolant Vessel would contain the coolant fluid; the Helical or Looped Tubular Shape of Copper is immersed in the coolant fluid (See 4.2 Following). There are a variety of substances with properties that could, or would, serve as a coolant. For purposes of this simplified apparatus, water may be used. Considerations regarding the configuration of the Coolant Vessel would include:

4.1.1 Openings or ports in the wall(s) of the Coolant Vessel to allow an inlet for conducting Hydrogen comingled and/or immixed with other substances, products and/or by-products resulting from the reaction, and/or remaining after the reaction from the Helical or Looped Tubular Shape of Iron to the Helical or Looped Tubular Shape of Copper; and openings or ports in the wall(s) of the Coolant Vessel to allow an outlet for conducting Hydrogen, and other substances, products and/or by-products resulting from the reaction, and/or remaining after the reaction that are comingled and/or immixed with the Hydrogen subsequent the separation process.

4.1.1.1 The elevation of the Coolant Vessel and the locations of the openings or ports in the wall(s) of the Coolant Vessel should be coordinated to take advantage of the effect of gravity:

4.1.1.1.1 The outlet for conducting Hydrogen comingled and/or immixed with other substances, products and/or by-products resulting from the reaction, and/or remaining after the reaction from the Helical or Looped Tubular Shape of Iron, should be at a higher point relative the inlet for conducting Hydrogen comingled and/or immixed with other substances, products and/or by-products resulting from the reaction, and/or remaining after the reaction to the Helical or Looped Tubular Shape of Copper immersed in the coolant fluid (See 3.2.2.1 Prior).

4.1.1.1.2 The outlet for conducting from the Helical or Looped Tubular Shape of Copper immersed in the coolant fluid, after the separation process of the Hydrogen, and other substances, products and/or by-products resulting from the reaction, and/or remaining after the reaction that are comingled and/or immixed with the Hydrogen should be at a lower point relative the inlet for conducting Hydrogen comingled and/or immixed with other substances, products and/or by-products resulting from the reaction, and/or remaining after the reaction from the Helical or Looped Tubular Shape of Iron conducting Hydrogen comingled and/or immixed with other substances, products and/or by-products resulting from the reaction, and/or remaining after the reaction to the Helical or Looped Tubular Shape of Copper immersed in the coolant fluid.

4.1.2 The Coolant Vessel should be open at the top to the atmosphere to allow evaporative cooling of the water as coolant; the more energetic water molecules in the coolant vessel escape through the open top taking away heat cooling the balance of the water in the Coolant Vessel. The reference to "evaporative cooling" wherein water is used as coolant, resulting in a separation process via condensation of the Hydrogen, and other substances, products and/or by-products resulting from the reaction, and/or remaining after the reaction that are comingled and/or immixed with the Hydrogen; is for a simplified assembly that will allow the separation process. Alternative means not relying fully and/or partially on condensation using water as coolant are feasible; accordingly, the means and/or methods of separation of the Hydrogen, and other substances, products and/or by-products resulting from the reaction, and/or remaining after the reaction that are comingled and/or immixed with the Hydrogen, are variable, without limit, and combinable.

4.1.2.1 Due to the evaporative cooling process, water loss will occur and must be compensated; a water make-up system is necessary. It is recommended a simple floater system be used that detects the drop in water level inside the Coolant Vessel and triggers a valve or valves to open and provide feed water from a reservoir vessel, a feed line, or a water replenishment method combining both; that is, a reservoir vessel and a feed line.

4.1.2.1.1 The dimension and size of the coolant vessel; that is, its proportions, must be balanced between the requirements of the evaporative cooling and floater system assembly.

4.1.2.1.1.1 For convenience when emptying, it is recommended a drain valve be provided at or near the bottom of the Coolant Vessel.

4.2 Helical or Looped Tubular Shape of Copper—The Helical or Looped Tubular Shape of Copper is immersed in the water as coolant within the Coolant Vessel. (See 4.1 Prior) Hydrogen comingled and/or immixed with other substances, products and/or by-products resulting from the reaction, and/or remaining after the reaction will be conducted from the Helical or Looped Tubular Shape of Iron to the Helical or Looped Tubular Shape of Copper (See 3.2.2.1 and 4.1.1.1.1 Prior). A Helical or Looped Tubular Shape is recommended to increase exposure surface of the copper to Hydrogen comingled and/or immixed with other substances, products and/or by-products resulting from the reaction, and/or remaining after the reaction, the time of the exposure, and to allow for expansion and contraction of the copper. Also, a flexible connection from the Helical or Looped Tubular Shape of Iron to the Helical or Looped Tubular Shape of Copper is recommended to allow for expansion and contraction differences between dissimilar materials.

4.2.1 The copper due to its thermal conductivity initiates a separation process of the Hydrogen, and other substances, products and/or by-products resulting from the reaction, and/or remaining after the reaction that are comingled and/or immixed with the Hydrogen, via the removal of energy.

4.2.1.1 Heat exchange occurs through the wall of the Helical or Looped Tubular Shape of Copper; whereby energy is transferred between the water as coolant, and the Hydrogen and other comingled and/or immixed substances, products and/or by-products, resulting from the reaction, and/or remaining after the reaction.

4.2.1.2 The Helical or Looped Tubular Shape of Copper connects to a Sealed Vessel (See 5.1 Following) wherein the Hydrogen, and other substances, products and/or by-products resulting from the reaction, and/or remaining after the reaction that are comingled and/or immixed with the Hydrogen having undergone separation are collected.

5.0 Hydrogen Isolation Phase—This Phase involves two components and/or features; a Sealed Vessel and a Siphon Line. The Hydrogen, and other substances, products and/or by-products resulting from the reaction, and/or remaining after the reaction that are comingled and/or immixed with the Hydrogen having undergone separation are collected in the Sealed Vessel. The Sealed Vessel is connected to the Helical or Looped Tubular Shape of Copper immersed in the Coolant Vessel (See 4.2 Prior). During collection, that is, as the separated Hydrogen, and other substances, products and/or by-products resulting from the reaction, and/or remaining after the reaction that are comingled and/or immixed with the Hydrogen are drained into the Sealed Vessel from the Helical or Looped Tubular Shape of Copper immersed in the Coolant Vessel; the lighter substances being gaseous and/or vaporous rise to the top of the Sealed Vessel. A Siphon Line from the top of the Sealed Vessel would conduit off the gases and vapors. Among the gases would be Hydrogen; the lightest of the gases. The isolation process as described is a simplified assembly. Alternative means for achieving the isolation of Hydrogen, and other substances, products and/or by-products resulting from the reaction, and/or remaining after the reaction that are comingled and/or immixed with the Hydrogen are available; accordingly, the means and/or methods of achieving the isolation process are variable, without limit, and combinable. The reference to "collected in the Sealed Vessel" wherein the Hydrogen, and other substances, products and/or by-products resulting from the reaction, and/or remaining after the reaction that are comingled and/or immixed with the Hydrogen having undergone separation are retained; is for a simplified assembly that will allow the separation process. Alternative means are feasible for isolation and collection; accordingly, the means and/or methods of isolating and collecting the Hydrogen, and other substances, products and/or by-products resulting from the reaction, and/or remaining after the reaction that are comingled and/or immixed with the Hydrogen, are variable, without limit, and combinable 5.1 Sealed Vessel—The Sealed Vessel collects the separated Hydrogen, and other substances, products and/or by-products resulting from the reaction, and/or remaining after the reaction that are comingled and/or immixed with the Hydrogen. Considerations regarding the configuration of the Sealed Vessel would include:

5.1.1 The elevation of the Sealed Vessel and the locations of the openings or ports at or near the top of the Sealed Vessel should be coordinated to take advantage of the effect of gravity; openings or ports at or near the top of the Sealed Vessel to allow:

5.1.1.1 The inlet for conducting Hydrogen comingled and/or immixed with other substances, products and/or by-products resulting from the reaction, and/or remaining after the reaction from the Helical or Looped Tubular Shape of Copper immersed in the Coolant Vessel to the Sealed Vessel, should be at a lower point relative the outlet for conducting Hydrogen comingled and/or immixed with other substances, products and/or by-products resulting from the reaction, and/or remaining after the reaction from the Helical or Looped Tubular Shape of Copper immersed in the Coolant Vessel to the Sealed Vessel. (See 4.1.1.1.2 Prior)

5.1.1.2 An outlet for a Siphon Line to conduit off the gases and vapors. (See 5.2 Following)

5.1.2 For convenience, it is recommended a drain valve be provided near bottom of the Coolant Vessel for non-gaseous and/or non-vaporous substances, products and/or by-products resulting from the reaction.

5.2 Siphon Line—Conduits off the gases and vapors; including Hydrogen, the lightest gas. Considerations regarding the configuration of the Siphon Line would include:

5.2.1 Connects to the near top of the Sealed Vessel.

5.2.1.1 Direction of line leads upwards and of sufficient length to a allow Other Substances in vapor remaining immixed with the Hydrogen to condense onto interior of Piping and flow back into Sealed Vessel; or remain unmixed with the Hydrogen within the line.

5.2.1.1.1 Line would tie in with a hydrogen collection system and/or method.

6.0 Hydrogen Collection Phase—Components and/or features are not specified for this stage as a variety of systems and/or methods exist for collecting gas. Hydrogen, being the lightest gas, can be accumulated via upward delivery into a chamber; or the upward delivery may be coupled with an over water or pneumatic trough method wherein water is displaced within the chamber as gas accumulates (very workable as Hydrogen is sparingly soluble in water). Regardless, no final specification for gas collection is proposed; for purposes of this simplified apparatus upward delivery into a chamber coupled with an over water or pneumatic trough method would serve. It is noted however, that alternate means for Hydrogen Collection are feasible; accordingly, the means and/or methods of collecting the Hydrogen are variable, without limit, and combinable.

SUMMARY OF THE INVENTION

It is a principal object of the invention to provide a feasible method for the production and/or derivation of Hydrogen.

It is a primary object of this invention to provide a process, method and device for the production and/or derivation of hydrogen utilizing microwave energy through use of a microwave susceptor that will absorb and/or assimilate microwave energy and convert it to radiant/heat energy and impart the energy to iron and alter its physical characteristics (such as, but not necessarily limited to its temperature), so that water, upon contact with the iron element, will in turn, alter the water's physical characteristics (such as, but not necessarily limited to its temperature), and result in a reaction of the water and the iron element to produce and/or derive hydrogen. Patent also includes the progressive change to water prior to it achieving a reactive threshold with the iron element to produce and/or derive hydrogen via the process, method and device of this invention; and, the progressive preparation and/or pretreatment of water, via exposure or contact of water with other materials with high thermal conductivities in lieu of iron through use of a microwave susceptor that will absorb and/or assimilate microwave energy and convert it to radiant/heat energy and impart the energy to said other materials with high thermal conductivities and alter their physical characteristics (such as, but not necessarily limited to their temperature), so that water, upon contact with said other materials with high thermal conductivities, will alter the water's physical characteristics (such as, but not necessarily limited to its temperature).

It is an additional object of the invention that via the process, method and device of this invention, Hydrogen produced may be "burned" cleanly, resulting in water, thus the energy produced burning hydrogen is "clean", with no toxic by-products as a result of burning hydrogen. It is recognized that some disposal or containment may be required of the by-product resulting from the reaction of iron element (or compound(s), amalgam(s), alloy(s), composite(s), and/or synthesis(es) with, or of, the iron element) with water. However, the by-product resulting from the reaction of iron element (or compound(s), amalgam(s), alloy(s), composite(s), and/or synthesis(es) with, or of, the iron element) with water are not toxic and stable.

It is an additional object of the invention to provide a means of heating via the use of Argon and Sulfur as a microwave susceptor; that is, the combined use of Argon and Sulfur in a manner rendering them capable of absorbing and/or assimilating microwave energy and converting it to radiant/heat energy.

It is another object of the invention to provide a hydrogen producing and/or deriving device that can be used in a wide range of sizes and conditions, ranging from a unit for an individual house or mobile home to larger units.

It is an additional object of the invention that the device be usable on mobile, energy-consuming objects such as vehicles, boats, and planes.

It is an additional object of the invention that the device can be modified in tandem with the amount of hydrogen produced and/or required for end use.

It is a final object of this invention to teach a method of accomplishing the goals set forth in the previous sentences relating to the functioning of the device.

It should be understood the while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

What I claim is:

1. A device for the production of hydrogen, comprising,
    one or more microwave generating devices capable of producing microwaves, where the microwaves are directed from the one or more microwave generating devices into a cavity resonator, where the cavity resonator comprises two or more ports, where the cavity resonator may or may not create a resonant effect to retain microwave energy within the cavity, where the two or more ports are connected to at least one water supply inlet and at least one hydrogen outlet,
    a quantity of water
    a source of water
    a device capable of conveying the quantity of water from the source of water to the at least one water supply inlet of the cavity resonator,
    a device capable of exerting force on the quantity of water to create a flow of the quantity of water from the source of water to the at least one water supply inlet of the cavity resonator,
    a covering material that is capable of absorbing microwave energy and transferring that energy, as radiant heat energy, to a material with high thermal conductivity, which is positioned within the cavity resonator such that it is irradiated with microwaves from the one or more microwave generating devices, and is comprised of a material that is capable of absorbing microwave energy and converting the microwave energy into radiant/heat energy,
    a conduit-chamber, where the conduit chamber comprises one or more materials with high thermal conductivity, where the one or more materials with high thermal conductivity comprises iron, where the conduit chamber comprises two ends and one or more walls, such that the two ends and one or more walls form a closed chamber, where one of the two ends is connected to a source of water, and the other of the two ends is connected to a channeled outlet, where the closed chamber comprises one or more sections, and where one or more reactions can take place inside of the closed chamber,
    where, the conduit-chamber is in close physical proximity to the covering material such that radiant energy from the covering material substantially inundates the conduit-chamber,
    where, the covering material, upon being struck with microwaves generated from the one or more microwave generating devices, transfers radiant/heat energy to the conduit-chamber in which one or more reactions will take place,
    where the covering material is shaped such that it conforms with the conduit-chamber,
    a device capable of separating hydrogen from any non-hydrogen substances, by-products, or remaining products, and
    a hydrogen collector, comprising a chamber in which hydrogen gas can be stored for later use.

2. The device of claim 1, additionally comprising a pre-heating device, where the pre-heating device is located within the cavity resonator where the pre-heating device comprises
    a second material with high thermal conductivity that is capable of containing the quantity of water and allowing the quantity of water to flow from one end of the pre-heating device to the other, and
    a second covering material, where the second covering material is capable of absorbing microwave energy and transferring that energy, as radiant heat energy, to the length of second material with high thermal conductivity, where the second covering material is capable of absorbing microwave energy and transferring that energy to a material with high thermal conductivity, where the second material with high thermal conductivity is in close physical proximity to the second covering material such that radiant energy from the covering material substantially inundates the quantity of water contained within the second material with high thermal conductivity thereby raising the temperature of the quantity of water,
    where the second covering material is shaped such that it conforms with the second material with high thermal conductivity, and
    where one end of the pre-heating device can be connected to a source of water, and the other end has an outlet through which the pre-heated water can flow to the conduit-chamber.

3. The device of claim 1, where the microwave generating device is a microwave oven.

4. The device of claim 1, where the material that is capable of absorbing microwave energy and transferring that energy to a material with high thermal conductivity is a microwave susceptor.

5. The device of claim 1, where the conduit-chamber is a tubular metal conduit.

6. The device of claim 1, further comprising a condenser, where the condenser comprises a coolant vessel, a condensing tubular copper conduit, a quantity of coolant, and a coolant replacement device,
    where the coolant vessel contains the quantity of coolant,
    where the condensing tubular copper conduit is comprised of a quantity of copper, where the condensing tubular copper conduit is immersed in the coolant inside of the coolant vessel, where the copper in the condensing tubular copper conduit has a high degree of thermal conductivity,
    where, the coolant vessel comprises, at least one side, at least one bottom, and at least one top section which are connected to each other such as to form a container, where the at least one top section has at least one opening which will allow for evaporative cooling of the coolant, at least one port which connects to the conduit-chamber, and at least one outlet port through where the at least one port which connects to the conduit-chamber is located higher than the condensing tubular copper conduit, and the at least one outlet port is located lower than the at least one port which connects to the conduit-chamber, and
    where the coolant replacement device is capable of replacing coolant lost to evaporative cooling and any other source of loss of coolant.

7. The device of claim 1, further comprising a hydrogen isolation device, where the hydrogen isolation device comprises a sealed vessel, a siphon line, where the siphon line is connected to the top of the sealed vessel, where hydrogen, being lighter than liquid, rises to the top of the sealed vessel and travels through the siphon line to the hydrogen collector.

8. The device of claim 1, where the conduit-chamber consists of a first section which is a tubular conduit consisting of copper, and a second section consisting of iron, where the first section is connected to the second section, and where water can flow first through the first section, and next through the second section.

9. The device of claim 1, where the conduit-chamber is shaped in a helical pattern.

10. The device of claim 1, where the conduit-chamber is shaped in a looped pattern.

11. The device of claim 1, where the microwave generating device has metal walls, and, where the microwave generating device has a cooking power of 850 Watts or greater.

12. The device of claim 1, where the locations of the at least two or more ports are connected to at least one water supply inlet and at least one hydrogen outlet are located to take advantage of gravity, such that the at least one water supply inlet is located above the conduit-chamber and the at least one hydrogen outlet is located lower than the conduit-chamber.

13. The device of claim 6, where the condensing tubular copper conduit is helical or looped in shape.

14. The device of claim 1, where the cavity resonator has dimensions such that microwaves do not dissipate into the walls, but rather retain a resonant effect.

15. The device of claim 1, further comprising insulating materials, where the insulating materials are located externally and proximate to the cavity resonator.

16. A process for producing hydrogen, involving the following steps:
first, obtaining the following materials:
one or more microwave generating devices capable of producing microwaves, whereby the microwaves are directed from the one or more microwave generating devices into a cavity resonator, where the cavity resonator comprises two or more ports, where the cavity resonator may or may not create a resonant effect to retain microwave energy within the cavity, where the two or more ports are connected to at least one water supply inlet and at least one hydrogen outlet,
a quantity of water
a source of water
a device capable of conveying the quantity of water from the source of water to the at least one water supply inlet of the cavity resonator,
a device capable of exerting force on the quantity of water to create a flow of the quantity of water from the source of water to the at least one water supply inlet of the cavity resonator,
a covering material that is capable of absorbing microwave energy and transferring that energy, as radiant heat energy, to a material with high thermal conductivity, which is positioned within the cavity resonator such that it is irradiated with microwaves from the one or more microwave generating devices, and is comprised of a material that is capable of absorbing microwave energy and converting the microwave energy into radiant/heat energy,
a conduit-chamber, where the conduit chamber comprises one or more materials with high thermal conductivity, where the one or more materials with high thermal conductivity is iron, where the conduit chamber comprises two ends and one or more walls, such that the two ends and one or more walls form a closed chamber, where one of the two ends is connected to a source of water, and the other of the two ends is connected to a channeled outlet, where the closed chamber comprises one or more sections, and where one or more reactions can take place inside of the closed chamber,
where, the conduit-chamber is in close physical proximity to the covering material such that radiant energy from the covering material substantially inundates the conduit-chamber,
where, the covering material, upon being struck with microwaves generated from the one or more microwave generating devices, transfers radiant/heat energy to the conduit-chamber in which one or more reactions will take place,
where the covering material is shaped such that it conforms with the conduit-chamber,
a device capable of separating hydrogen from any non-hydrogen substances, by-products, or remaining products,
a device for isolating hydrogen, and
a hydrogen collector, comprising a chamber in which hydrogen gas can be stored for later use,
second, providing adequate water and energy to the materials of the first step to create hydrogen,
third, containing the hydrogen.

17. A process for creating hydrogen from two or more components, one of which is water, involving the following steps:
first, obtaining the following materials:
one or more microwave generating devices capable of producing microwaves, whereby the microwaves are directed from the one or more microwave generating devices into a cavity resonator, where the cavity resonator comprises two or more ports, where the cavity resonator may or may not create a resonant effect to retain microwave energy within the cavity, where the two or more ports are connected to at least one water supply inlet and at least one hydrogen outlet,
a quantity of water
a source of water
a device capable of conveying the quantity of water from the source of water to the at least one water supply inlet of the cavity resonator,
a device capable of exerting force on the quantity of water to create a flow of the quantity of water from the source of water to the at least one water supply inlet of the cavity resonator,
a covering material that is capable of absorbing microwave energy and transferring that energy, as radiant heat energy, to a material with high thermal conductivity, which is positioned within the cavity resonator such that it is irradiated with microwaves from the one or more microwave generating devices, and is comprised of a material that is capable of absorbing microwave energy and converting the microwave energy into radiant/heat energy,
a conduit-chamber, where the conduit chamber comprises one or more materials with high thermal conductivity, where the one or more materials with high thermal conductivity is iron, where the conduit chamber comprises two ends and one or more walls, such that the two ends and one or more walls form a closed chamber, where one of the two ends is connected to a source of water, and the other of the two ends is connected to a channeled outlet, where the closed chamber comprises one or more sections, and where one or more reactions can take place inside of the closed chamber, where, the conduit-chamber is in close physical proximity to the covering material such that radiant energy from the covering material substantially inundates the conduit-chamber, where, the covering material, upon being struck with microwaves generated from the one or more microwave generating devices, transfers radiant/heat energy to the conduit-chamber in which one or more reactions will take place, where the covering material is shaped such that it conforms with the conduit-chamber, a device capable of separating the hydrogen from any non-hydrogen substances, by-products, or remaining products, a device for isolating hydrogen comprising a condenser, where the condenser comprises a coolant vessel, a condensing tubular copper conduit, a quantity of coolant, and a coolant replacement device, where the coolant vessel contains the quantity of coolant, where the condensing tubular copper conduit is comprised of a quantity of copper, where the condensing tubular copper conduit is immersed in the coolant inside of the coolant vessel, where the copper in the condensing tubular copper conduit has a high degree of thermal conductivity which allows for rapid energy transfer, where energy is transferred between the quantity of hydrogen and the coolant, which results in the quantity of hydrogen separating from any non-hydrogen substances and any by-products resulting from a reaction, where, the coolant vessel comprises, at least one side, at least one bottom, and at least one top section which are connected to each other such as to form a container, where the at least one top section has at least one opening which will allow for evaporative cooling of the coolant, at least one port which connects to the conduit-chamber, and at least one outlet port through which the quantity of hydrogen is removed, where, the at least one port which connects to the conduit-chamber is located higher than the condensing tubular copper conduit, and the at least one outlet port is located lower than the at least one port which connects to the conduit-chamber, and where the coolant replacement device is capable of replacing coolant lost to evaportative cooling and any other source of loss of coolant, a hydrogen collector, comprising a chamber in which hydrogen gas can be stored for later use, second, providing adequate water and energy to the materials of the first step to create hydrogen, third, containing the hydrogen, fourth, burning the hydrogen to produce energy.

* * * * *